US012581053B1

(12) United States Patent
Paré et al.

(10) Patent No.: US 12,581,053 B1
(45) Date of Patent: Mar. 17, 2026

(54) PASS-THROUGH ZOOM MODE FOR HEAD-MOUNTED DISPLAYS

(71) Applicant: Microsoft Technology Licensing, LLC, Redmond, WA (US)

(72) Inventors: Pascal Paré, Bothell, WA (US); Christian Markus Maekelae, Monroe, WA (US); Christopher Douglas Edmonds, Carnation, WA (US); Michael Bleyer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/980,081

(22) Filed: Dec. 13, 2024

(51) Int. Cl.
| | |
|---|---|
| *H04N 13/398* | (2018.01) |
| *H04N 13/239* | (2018.01) |
| *H04N 13/344* | (2018.01) |
| *H04N 23/69* | (2023.01) |

(52) U.S. Cl.
CPC ......... *H04N 13/398* (2018.05); *H04N 13/239* (2018.05); *H04N 13/344* (2018.05); *H04N 23/69* (2023.01)

(58) Field of Classification Search
CPC .. H04N 13/398; H04N 13/239; H04N 13/344; H04N 23/69
See application file for complete search history.

(56) References Cited

U.S. PATENT DOCUMENTS

| | | | | |
|---|---|---|---|---|
| 4,963,981 A * | 10/1990 | Todaka | ................. | H04N 23/69 |
| | | | | 348/240.2 |
| 2011/0234853 A1* | 9/2011 | Hayashi | ................. | G03B 13/02 |
| | | | | 348/E5.055 |
| 2014/0187857 A1* | 7/2014 | Wilson | ................. | H04N 13/356 |
| | | | | 600/103 |
| 2016/0259403 A1* | 9/2016 | Wang | ................. | G06F 3/005 |
| 2016/0292917 A1* | 10/2016 | Dorner | ................. | G02B 27/01 |
| 2018/0196472 A1* | 7/2018 | Lee | ................. | H04N 5/772 |
| 2019/0082101 A1* | 3/2019 | Baldwin | ............. | H04N 23/635 |
| 2019/0260931 A1* | 8/2019 | Rodriguez | ........... | G06T 19/006 |
| 2021/0382559 A1* | 12/2021 | Segev | ................. | G06V 10/806 |
| 2023/0111408 A1* | 4/2023 | Clagg | ................. | H04N 13/296 |
| | | | | 348/43 |

FOREIGN PATENT DOCUMENTS

WO WO-2023068087 A1 * 4/2023 ........... H04N 13/383

* cited by examiner

*Primary Examiner* — Justin W Rider
(74) *Attorney, Agent, or Firm* — Workman Nydegger

(57) ABSTRACT

A system for providing zoomed representations of scene content is configurable to: (i) capture one or more images using one or more image sensors; (ii) generate display output for presentation on one or more displays, wherein the display output comprises at least a first region and a second region, wherein the first region depicts first scene content represented in the one or more images with a first zoom level, and wherein the second region depicts second scene content represented in the one or more images with a second zoom level, wherein the second zoom level is different from the first zoom level; and (iii) present the display output using the one or more displays, wherein, upon capturing the one or more images, generating the display output and presenting the display output occurs in real time or near real time.

19 Claims, 15 Drawing Sheets

System
100

Figure 10:
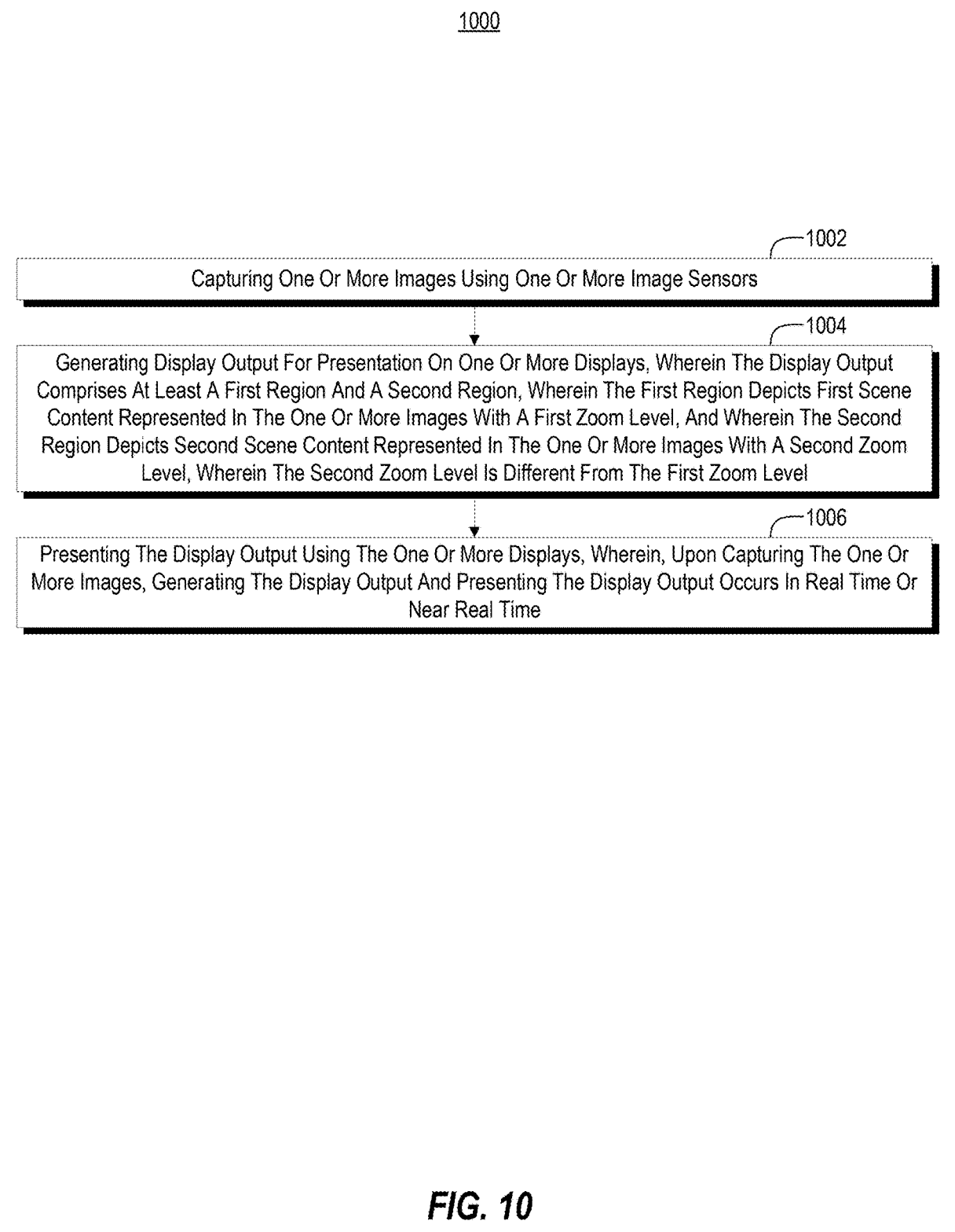

1000

1002

Capturing One Or More Images Using One Or More Image Sensors

1004

Generating Display Output For Presentation On One Or More Displays, Wherein The Display Output Comprises At Least A First Region And A Second Region, Wherein The First Region Depicts First Scene Content Represented In The One Or More Images With A First Zoom Level, And Wherein The Second Region Depicts Second Scene Content Represented In The One Or More Images With A Second Zoom Level, Wherein The Second Zoom Level Is Different From The First Zoom Level

1006

Presenting The Display Output Using The One Or More Displays, Wherein, Upon Capturing The One Or More Images, Generating The Display Output And Presenting The Display Output Occurs In Real Time Or Near Real Time

Figure 11:
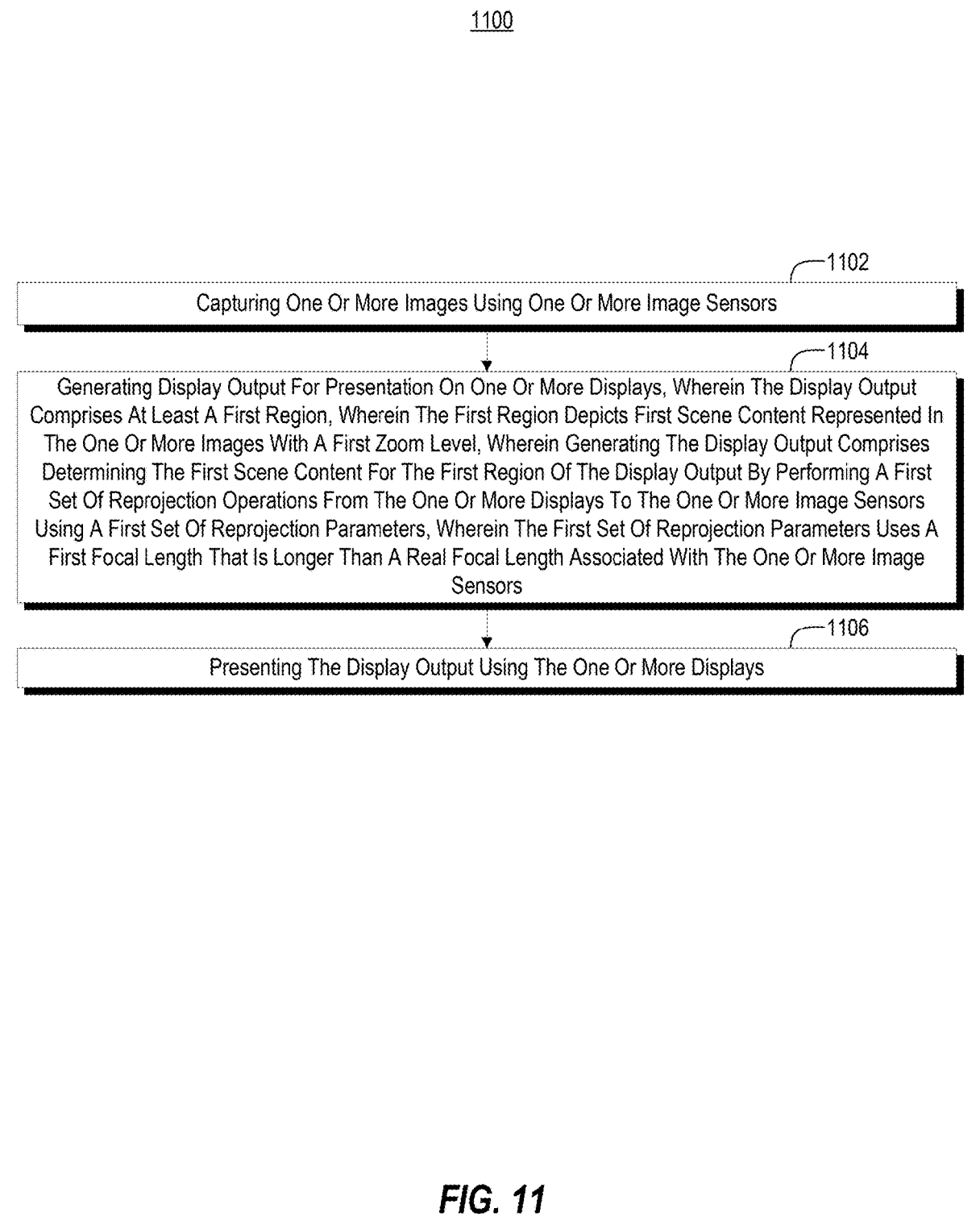

Capturing One Or More Images Using One Or More Image Sensors

1104

Generating Display Output For Presentation On One Or More Displays, Wherein The Display Output Comprises At Least A First Region, Wherein The First Region Depicts First Scene Content Represented In The One Or More Images With A First Zoom Level, Wherein Generating The Display Output Comprises Determining The First Scene Content For The First Region Of The Display Output By Performing A First Set Of Reprojection Operations From The One Or More Displays To The One Or More Image Sensors Using A First Set Of Reprojection Parameters, Wherein The First Set Of Reprojection Parameters Uses A First Focal Length That Is Longer Than A Real Focal Length Associated With The One Or More Image Sensors

1106

Presenting The Display Output Using The One Or More Displays

Figure 12:
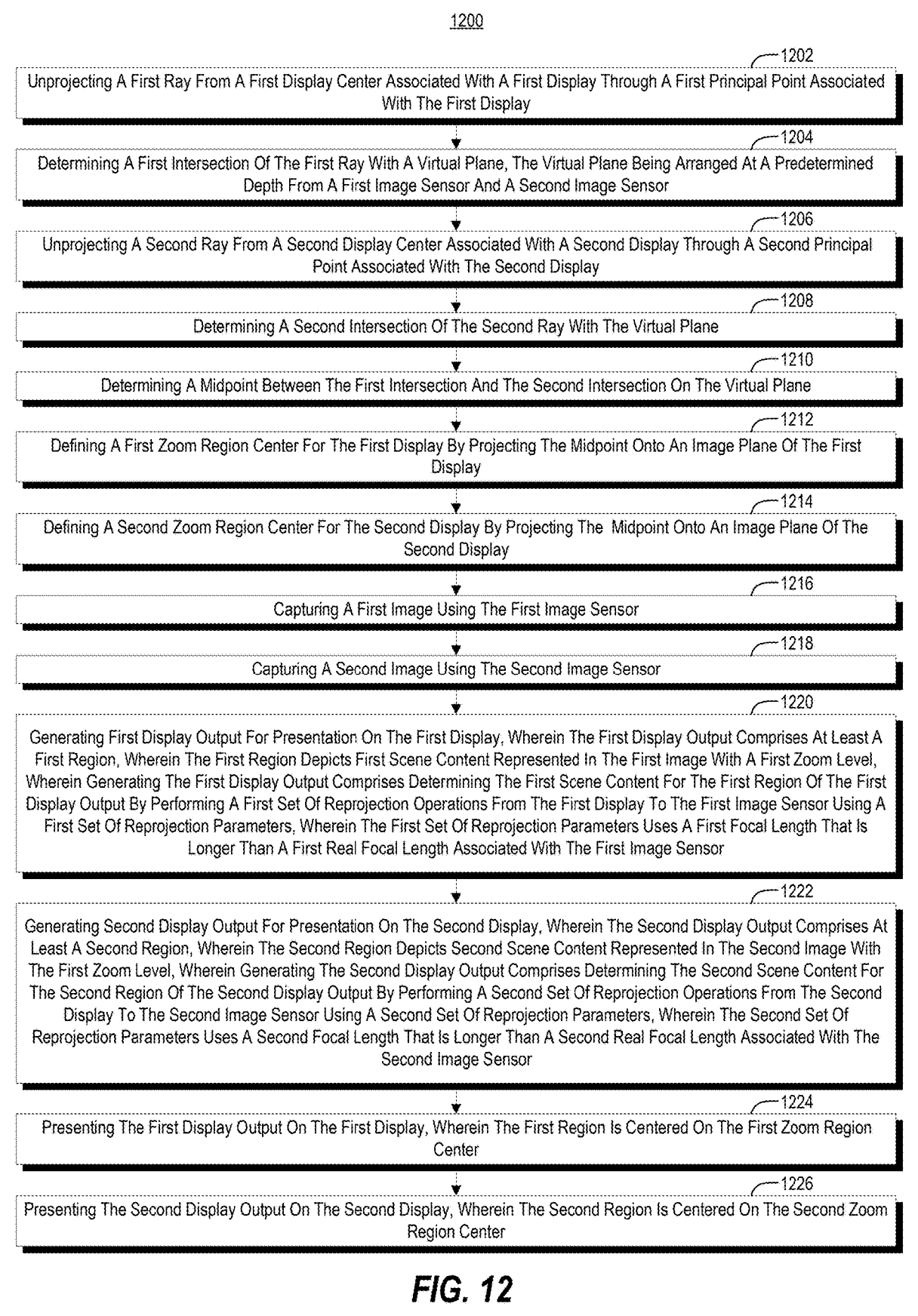

1202
Unprojecting A First Ray From A First Display Center Associated With A First Display Through A First Principal Point Associated With The First Display 1204
Determining A First Intersection Of The First Ray With A Virtual Plane, The Virtual Plane Being Arranged At A Predetermined Depth From A First Image Sensor And A Second Image Sensor 1206
Unprojecting A Second Ray From A Second Display Center Associated With A Second Display Through A Second Principal Point Associated With The Second Display 1208
Determining A Second Intersection Of The Second Ray With The Virtual Plane 1210
Determining A Midpoint Between The First Intersection And The Second Intersection On The Virtual Plane 1212
Defining A First Zoom Region Center For The First Display By Projecting The Midpoint Onto An Image Plane Of The First Display 1214
Defining A Second Zoom Region Center For The Second Display By Projecting The  Midpoint Onto An Image Plane Of The Second Display 1216
Capturing A First Image Using The First Image Sensor 1218
Capturing A Second Image Using The Second Image Sensor 1220
Generating First Display Output For Presentation On The First Display, Wherein The First Display Output Comprises At Least A First Region, Wherein The First Region Depicts First Scene Content Represented In The First Image With A First Zoom Level, Wherein Generating The First Display Output Comprises Determining The First Scene Content For The First Region Of The First Display Output By Performing A First Set Of Reprojection Operations From The First Display To The First Image Sensor Using A First Set Of Reprojection Parameters, Wherein The First Set Of Reprojection Parameters Uses A First Focal Length That Is Longer Than A First Real Focal Length Associated With The First Image Sensor 1222
Generating Second Display Output For Presentation On The Second Display, Wherein The Second Display Output Comprises At Least A Second Region, Wherein The Second Region Depicts Second Scene Content Represented In The Second Image With The First Zoom Level, Wherein Generating The Second Display Output Comprises Determining The Second Scene Content For The Second Region Of The Second Display Output By Performing A Second Set Of Reprojection Operations From The Second Display To The Second Image Sensor Using A Second Set Of Reprojection Parameters, Wherein The Second Set Of Reprojection Parameters Uses A Second Focal Length That Is Longer Than A Second Real Focal Length Associated With The Second Image Sensor 1224
Presenting The First Display Output On The First Display, Wherein The First Region Is Centered On The First Zoom Region Center 1226
Presenting The Second Display Output On The Second Display, Wherein The Second Region Is Centered On The Second Zoom Region Center

1302
Obtaining One Or More Images Using One Or More Image Sensors, Wherein The One Or More Images Includes A First Set Of Pixels And A Second Set Of Pixels 1304
Generating A First Tone Mapping Operator Using A First Set Of Pixel Values Associated With The First Set Of Pixels 1306
Generating A Second Tone Mapping Operator Using The First Set Of Pixel Values And A Second Set Of Pixel Values Associated With The Second Set Of Pixels 1308
Generating A First Set Of Tone-Mapped Pixel Values By Applying The First Tone Mapping Operator To The First Set Of Pixel Values 1310
Generating A Second Set Of Tone-Mapped Pixel Values By Applying The Second Tone Mapping Operator To The Second Set Of Pixel Values 1312
Refraining From Applying The First Tone Mapping Operator To At Least Some Of The Second Set Of Pixel Values And To Refrain From Applying The Second Tone Mapping Operator To At Least Some Of The First Set Of Pixel Values 1314
Generating An Output Image Using The First Set Of Tone-Mapped Pixel Values And The Second Set Of Tone-Mapped Pixel Values

Obtaining One Or More Images Using One Or More Image Sensors, Wherein The One Or More Images Includes A First Set Of Pixels, A Second Set Of Pixels, And A Third Set Of Pixels, Wherein The Third Set Of Pixels Includes Pixels That Are Included In Both The First Set Of Pixels And The Second Set Of Pixels
⌐1402

Generating A First Tone Mapping Operator Using A First Set Of Pixel Values Associated With The First Set Of Pixels
⌐1404

Generating A Second Tone Mapping Operator Using At Least A Second Set Of Pixel Values Associated With The Second Set Of Pixels
⌐1406

Generating A First Set Of Tone-Mapped Pixel Values By Applying The First Tone Mapping Operator To The First Set Of Pixel Values
⌐1408

Generating A Second Set Of Tone-Mapped Pixel Values By Applying The Second Tone Mapping Operator To The Second Set Of Pixel Values
⌐1410

Generating A Third Set Of Tone-Mapped Pixel Values By Combining Tone-Mapped Pixel Values From The First Set Of Tone-Mapped Pixel Values And The Second Set Of Tone-Mapped Pixel Values
⌐1412

Refraining From Applying The First Tone Mapping Operator To At Least Some Of The Second Set Of Pixel Values And To Refrain From Applying The Second Tone Mapping Operator To At Least Some Of The First Set Of Pixel Values
⌐1414

Generating An Output Image Using The First Set Of Tone-Mapped Pixel Values, The Second Set Of Tone-Mapped Pixel Values, And The Third Set Of Tone-Mapped Pixel Values
⌐1416

┌─ 1502
Obtaining One Or More Images Using One Or More Image Sensors, Wherein The One Or More Images Includes A First Set Of Pixels And A Second Set Of Pixels ┌─ 1504
Generating A First Tone Mapping Operator Using A First Set Of Pixel Values Associated With The First Set Of Pixels ┌─ 1506
Generating A Second Tone Mapping Operator Using At Least A Second Set Of Pixel Values Associated With The Second Set Of Pixels ┌─ 1508
Generating A First Set Of Tone-Mapped Pixel Values By Applying The First Tone Mapping Operator To The First Set Of Pixel Values ┌─ 1510
Generating A Second Set Of Tone-Mapped Pixel Values By Applying The Second Tone Mapping Operator To The Second Set Of Pixel Values ┌─ 1512
Generating An Output Image Using The First Set Of Tone-Mapped Pixel Values And The Second Set Of Tone-Mapped Pixel Values ┌─ 1514
Presenting The Output Image On The One Or More Displays, Wherein, Upon Obtaining The One Or More Images, Generating And Presenting The Output Image Occurs In Real Time Or Near Real Time

FIG. 15

PASS-THROUGH ZOOM MODE FOR HEAD-MOUNTED DISPLAYS

BACKGROUND

Mixed-reality (MR) systems, including virtual-reality and augmented-reality systems, have received significant attention because of their ability to create unique experiences for users. For reference, conventional virtual reality (VR) systems create a completely immersive experience by restricting their users' views to only a virtual environment. This is often achieved, in VR systems, through the use of a head-mounted device (HMD) that occludes any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Some MR systems include one or more cameras and utilize images and/or depth information obtained using the camera(s) to provide pass-through views of a user's environment to the user. A pass-through view can aid users in avoiding disorientation and/or safety hazards when transitioning into and/or navigating within a mixed-reality environment. Pass-through views may also enhance user views in low-visibility environments. For example, mixed-reality systems configured with long-wavelength thermal imaging cameras may facilitate visibility in smoke, haze, fog, and/or dust. Likewise, mixed-reality systems configured with low-light imaging cameras facilitate visibility in dark environments where the ambient light level is below the level required for human vision.

An MR system may provide pass-through views in various ways. For example, an MR system may present raw images captured by the camera(s) of the MR system to a user. In other instances, an MR system may modify and/or reproject captured image data to correspond to the perspective of a user's eye to generate pass-through views. An MR system may modify and/or reproject captured image data to generate a pass-through view using depth information for the captured environment obtained by the MR system (e.g., using a depth system of the MR system, such as a time-of-flight camera, a rangefinder, stereoscopic depth cameras, etc.). In some instances, an MR system utilizes one or more predefined depth values or planes to generate pass-through views (e.g., by performing planar reprojection).

In some instances, pass-through views generated by modifying and/or reprojecting captured image data may at least partially correct for differences in perspective brought about by the physical separation between a user's eyes and the camera(s) of the MR system (known as the "parallax problem," "parallax error," or, simply "parallax"). Such pass-through views/images may be referred to as "parallax-corrected" pass-through views/images. By way of illustration, parallax-corrected pass-through images may appear to a user as though they were captured by cameras that are co-located with the user's eyes.

Pass-through imaging can provide various beneficial user experiences, such as enabling users to perceive their surroundings in situations where ordinary human perception is limited. For instance, an MR system may be equipped with thermal cameras and be configured to provide pass-through thermal imaging, which may enable users to perceive objects in their environment even when smoke or fog is present. As another example, an MR system may be equipped with low light cameras and be configured to provide pass-through low light imaging, which may enable users to perceive objects in dark environments.

The subject matter claimed herein is not limited to embodiments that operate only in environments such as those described above. Rather, this background is only provided to illustrate one example technology area where some embodiments described herein may be practiced.

BRIEF DESCRIPTION OF THE DRAWINGS

To describe how the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which:

FIGS. 10-15 illustrate example flow diagrams depicting acts associated with the disclosed subject matter.

DETAILED DESCRIPTION

Figure 1:
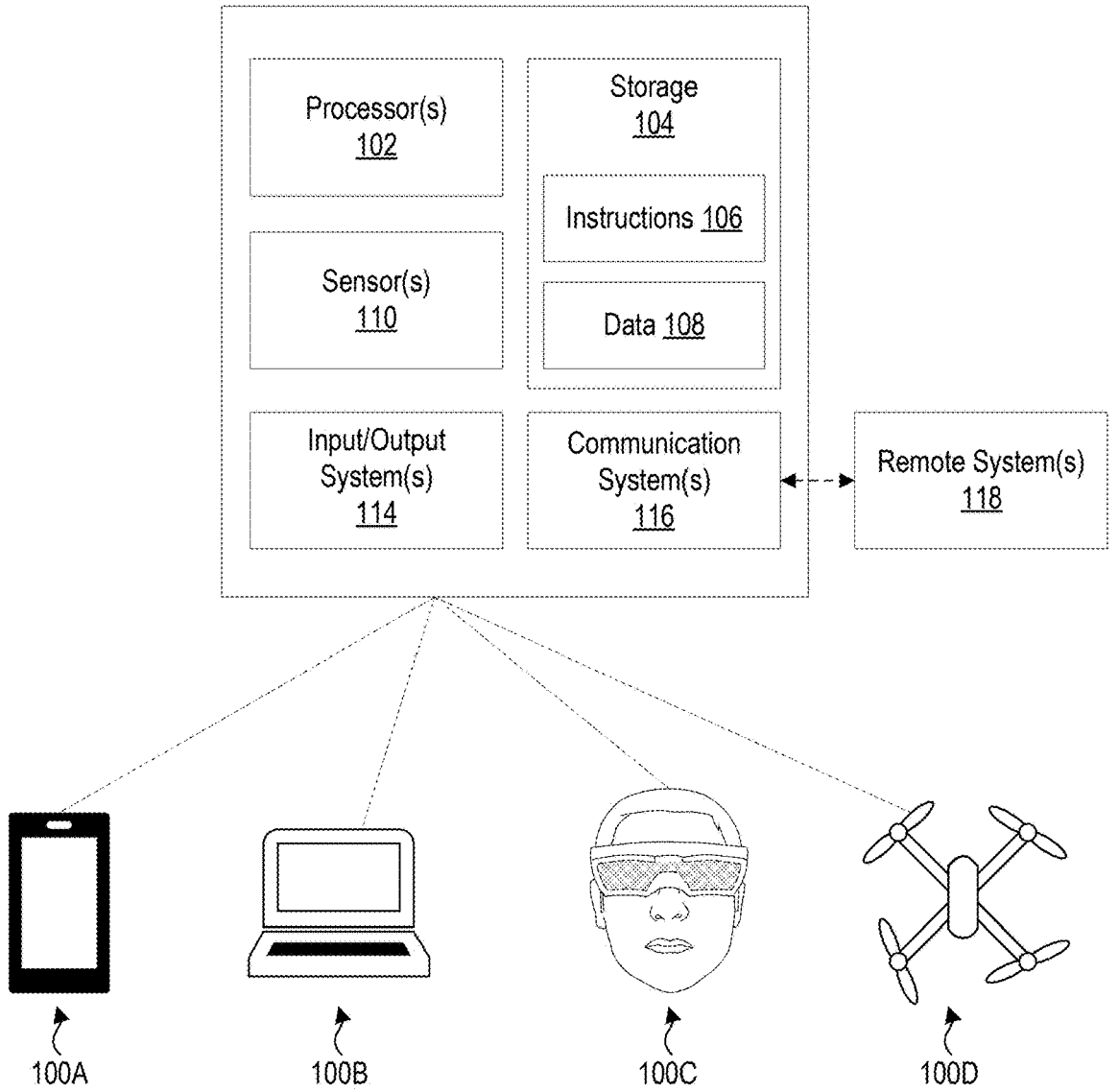
FIG. 1 illustrates example components of an example system that may include or be used to implement one or more disclosed embodiments.

Disclosed embodiments include systems, methods, and apparatuses for facilitating pass-through views in wearable devices (e.g., HMDs), including pass-through views that provide zoomed representations of scene content and pass-through views with different regions generated using different tone mapping operators.

Examples of Technical Benefits, Improvements, and Practical Applications

As noted above, wearable devices such as HMDs often include pass-through view functionality (or a pass-through mode). Pass-through views can enable users to perceive their surroundings in various circumstances, including low visibility environments (e.g., due to darkness, fog/smoke, etc.). However, existing pass-through technologies for HMDs are limited in their ability to provide users with the ability to see details of distant objects.

According to the disclosed subject matter, a system (e.g., an HMD) can include an image sensor and a display. The system can be configured to capture images of an environment to obtain scene content and perform reprojection operations from the display to the image sensor to determine scene content for display output. The reprojection operations can use reprojection parameters that include a focal length that is longer than a real focal length of the camera. The use of an increased focal length (and/or a correspondingly reduced field of view) can cause a higher number of pixels to be used to represent the same scene content in the display output (e.g., relative to the number of pixels that would be used if the real focal length of the camera were used for the reprojection operations). Accordingly, the display output generated using such techniques can provide a magnified representation of the scene content (e.g., a pass-through zoom mode), which can assist users in perceiving details of distant objects in real-world scenes.

In some implementations, a pass-through zoom mode as described above (and hereafter) can be selectively enabled or disabled by users of the system, which can allow users to easily transition between zoomed and un-zoomed representations of scene content. In some instances, systems may accommodate different zoom levels for pass-through zoom modes, which may be selected/changed based on user input. For instance, a user may provide user input selecting 2× magnification for a pass-through zoom mode, causing the system to generate display output by performing reprojection operations from the display to the image sensor using a focal length that is 2 times longer than the real focal length of the camera. To increase magnification, the user may provide user input selecting 3× (or higher) magnification, causing the system to use a focal length that is 3 times longer than the real focal length of the camera to generate display output for presentation on the display. Any magnification levels (even decreased magnification levels) and/or quantity of zoom settings may be supported on a system, in accordance with the disclosed subject matter.

In some embodiments, the display output presented on a display can include different regions. For instance, display output can include a first region that provides a zoomed representation of scene content and a second region that provides an un-zoomed representation of scene content. In some implementations, the zoomed region is positioned at a central region of the display, whereas the un-zoomed region includes the periphery of the display. Such a configuration can allow users to perceive the details of distant objects of interest (e.g., in the zoomed region) while simultaneously maintaining situational awareness (e.g., in the periphery or un-zoomed region).

Tone mapping is often performed on pass-through views generated by HMDs and/or other devices. Tone mapping can be performed to transform the tonal range (e.g., range of brightness values) of an image to improve visual appeal, image interpretability, and/or usability for particular displays or media. In some instances, tone mapping can reveal details to observers that are not visible in original imagery (e.g., due to lack of contrast). Histogram equalization is one example tone mapping technique, where a mapping for an input image is computed to cause the distribution of intensities in an output image to be substantially uniform. For instance, histogram equalization may cause an output image to have an image histogram where each of the bins have a substantially equal count or height.

The use of conventional tone mapping techniques on display output that includes a zoomed region and an un-zoomed region can cause various problems. By way of illustrative example, scene content for an un-zoomed region (e.g., a peripheral region of the display) can include highly illuminated objects and poorly illuminated objects, whereas scene content for a zoomed region (e.g., a central region of the display) can include moderately illuminated objects. Conventional tone mapping techniques (e.g., histogram equalization) would sacrifice the contrast of the moderately illuminated objects in the zoomed region to be able to render the highly illuminated and poorly illuminated objects in the un-zoomed region (e.g., the large number of bins necessitated by the broad range of intensities imposed by the highly illuminated and poorly illuminated objects would reduce the potential for contrast at intermediate intensities). This can result in a lack of perceivable detail in the objects depicted in the zoomed region, which can undermine user experiences.

As a converse example, a zoomed region could include highly illuminated and poorly illuminated objects, whereas the un-zoomed region could include moderately illuminated objects. In such an example, conventional tone mapping techniques would result in degraded detail in the un-zoomed region, which could harm situational awareness for users.

At least some disclosed embodiments are directed to tone mapping techniques that use different tone mapping operators for different image regions to generate display output, which can provide high-contrast tone mapping within zoomed regions and un-zoomed regions. For instance, the pixel values representing scene content within the zoomed region may be used to generate a first tone mapping operator, and pixel values representing scene content within the un-zoomed region may be used to generate a second tone mapping operator (the pixel values associated with the zoomed region may optionally also be used to generate the second tone mapping operator). The different tone mapping operators may be separately applied to the different sets of pixel values to generate tone-mapped pixel values for the zoomed region and the un-zoomed region, thereby preserving contrast in both regions.

Example Systems and Components

FIG. 1 illustrates various example components of a system 100 that may be used to implement one or more disclosed embodiments. For example, FIG. 1 illustrates a system 100 may include processor(s) 102, storage 104, sensor(s) 110, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise one or more computer-readable recording media and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more radar sensors (as will be described in more detail hereinbelow), image sensors, microphones, thermometers, barometers, magnetometers, accelerometers, gyroscopes, and/or others.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), other devices (e.g., self-driving vehicles), combinations thereof, etc. A system 100 may take on other forms in accordance with the present disclosure.

Pass-Through Zoom Mode

Figure 2:
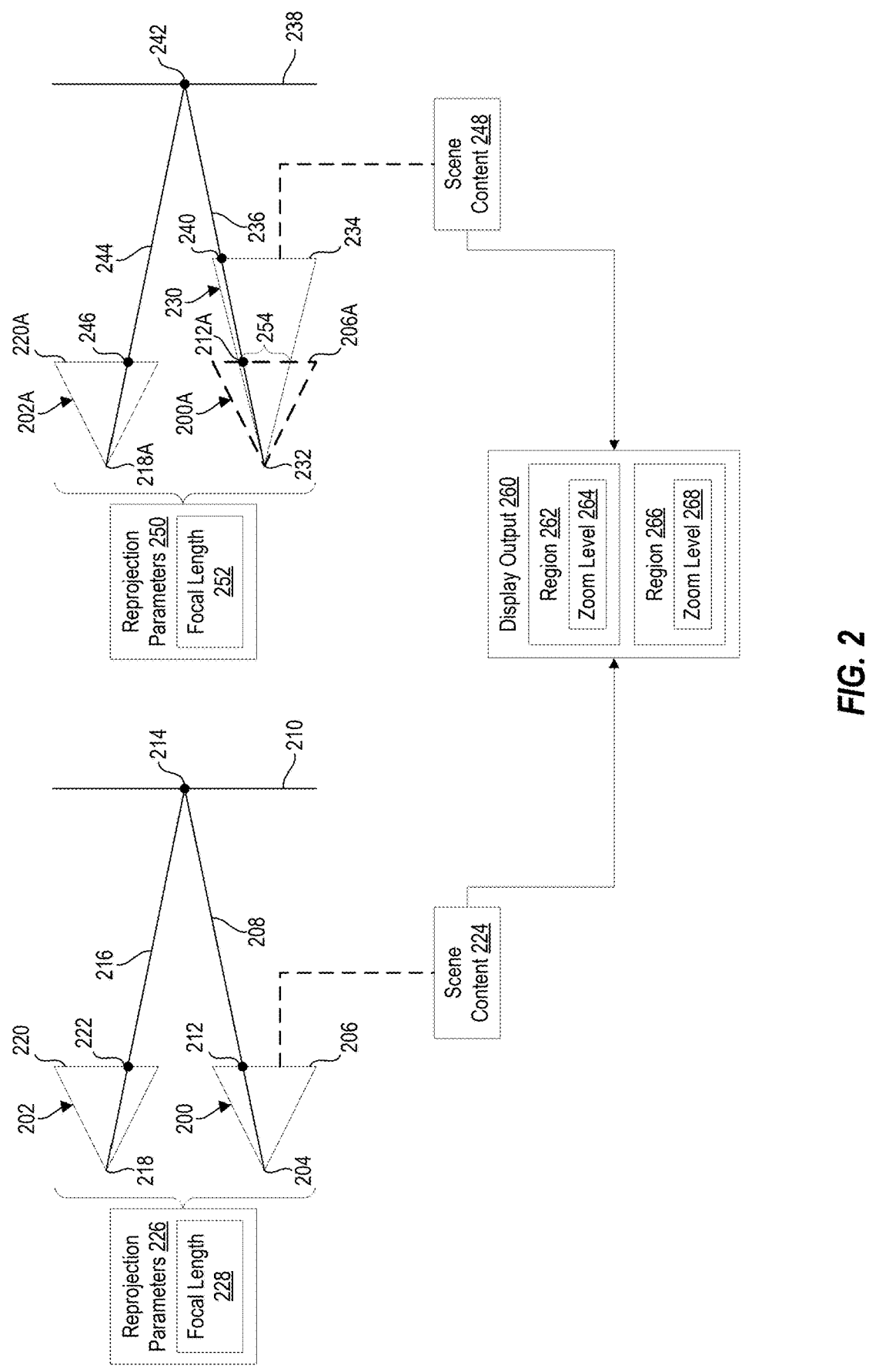
FIG. 2 illustrates a conceptual representation generating display output for representing scene content at different zoom levels.

FIG. 2 illustrates a conceptual representation generating display output for representing scene content at different zoom levels. In particular, FIG. 2 illustrates a conceptual representation of a display 200 (e.g., I/O system(s) 114 of a system 100) and an image sensor 202 (e.g., sensor(s) 110 of a system 100). The conceptual representation shown in FIG. 2 provides a side view of the display 200 and the image sensor 202, showing vertical displacement between the display 200 and the image sensor 202, which is how a display and an image sensor may be arranged on an MR HMD. FIG. 2 illustrates a display center 204 associated with the display 200, as well as a camera center 218 associated with the image sensor 202. The display center 204 may comprise a position from which display output presented on the display 200 (e.g., on a display panel 206 thereof) may be intended for viewing by the user (e.g., the display center 204 may comprise the expected position of a user's eye relative to the display panel 206). The camera center 218 may comprise the convergence or origination point for light passing through the optical system of the image sensor 202 (e.g., after passing through the image plane 220 and/or other components of the image sensor 202).

To facilitate pass-through imaging, the image sensor 202 may capture an image of the environment (or a series of images to provide pass-through video). For instance, the image plane 220 of the image sensor 202 may comprise or be associated with image sensor pixels, each of which may count or collect photons from the surrounding environment to obtain pixel values for representing scene points of the environment at a particular timepoint (i.e., timestamp). The collection of pixel values of the image sensor pixels may provide the image of the environment. The image of the environment may provide a basis for determining scene content 224 to construct display output 260 for presentation on the display 200, pursuant to providing pass-through views of the environment. In some implementations, the scene content 224 is determined by performing a reprojection operation for each display pixel of the display panel 206 to determine scene content to display at each display pixel.

FIG. 2 provides a conceptual representation of a reprojection operation for a display pixel 212 of the display panel 206, in which a ray 208 is unprojected through the display pixel 212 (e.g., from the display center 204) to a depth defined by a virtual plane 210, arriving at a point 214 in 3D space. In the example shown in FIG. 2, the virtual plane 210 represents a predefined depth plane or parallax plane for facilitating planar reprojection, though other depths may be used. For example, if a depth map exists for the environment relative to the positioning of the display 200, the ray 208 may be unprojected to the depth defined by the depth map for the display pixel 212.

From the point 214 in 3D space, a ray 216 may be projected onto the image plane 220 of the image sensor 202 (e.g., toward the camera center 218), causing the ray 216 to intersect with an image sensor pixel 222 of the image plane 220. As noted above, the image sensor pixel 222 may comprise or be associated with a pixel value for representing a scene point in the captured environment, and this pixel value may be used to define a display pixel value for the display pixel 212. The scene content 224 may comprise display pixel values defined for multiple display pixels of the display panel 206 (e.g., each being determined via reprojection operations performed for each of the display pixels to identify corresponding image sensor pixels and scene point pixel values from the image plane 220).

The reprojection operations used to determine the scene content 224 for the display pixels of the display panel 206 may be performed using reprojection parameters 226, which may define the unprojection depth, the positions of the display center 204 and the camera center 218, the pixel position of the display pixel for which reprojection is performed, etc. The reprojection parameters 226 may additionally include the focal length 228 of the image sensor 202. In the example shown in FIG. 2, the focal length 228 comprises the real focal length of the image sensor 202 and may therefore be defined by intrinsic properties of the image sensor 202 and/or the overarching system (e.g., system 100) of which the image sensor 202 is a part. By using the focal length 228 corresponding to the real focal length of the image sensor 202 for the reprojection operations, the scene content 224 may provide an un-zoomed representation of objects in the environment that are captured by the image sensor 202.

To obtain representations of the objects in the environment with a different zoom level, reprojection operations may be performed using different reprojection parameters. For instance, FIG. 2 conceptually depicts alternative reprojection parameters 250 which may include a focal length 252 that is different from the focal length 228 of the reprojection parameters 226. For instance, focal length 252 may be longer than focal length 228. In some instances, the reprojection parameters 250 may include a field of view that is smaller than that of the reprojection parameters 226.

FIG. 2 conceptually depicts reprojection operations performed using the alternative reprojection parameters 250. In particular, FIG. 2 illustrates a virtual display 230 that is co-located with the real display 200A (which corresponds to the display 200 described above). FIG. 2 illustrates the display center 232 of the virtual display 230 being at the same position as the display center of the real display 200A. The virtual display 230 embodies the focal length 252 of the alternative reprojection parameters 250 described above. For instance, FIG. 2 shows the virtual display panel 234 of the virtual display 230 positioned at a greater distance from the display center 232 than the display panel 206A of the real display 200A. FIG. 2 depicts unprojection of a ray 236 through a virtual display pixel 240 of the virtual display panel 234 to a depth defined by a virtual plane 238 (e.g., similar to virtual plane 210), indicating a point 242 in 3D space. FIG. 2 also depicts projection of a ray 244 from the point 242 toward the camera center 218A (corresponding to camera center 218) through the image plane 220A (corresponding to image plane 220) of the image sensor 202A (corresponding to image sensor 202) to identify an image sensor pixel 246. The image sensor pixel 246 may indicate (or be used to determine) a pixel value for representing a scene point in the captured environment, which may become associated with the virtual display pixel 240. Similar reprojection operations may be performed for each virtual display pixel of the virtual display panel 234 to obtain scene content 248.

Within an overlap region 254 between the virtual display 230 and the real display 200A (e.g., where the field of view of the real display 200A overlaps with the field of view of the virtual display 230), the scene content 248 obtained via reprojections using reprojection parameters 250 may depict the same parts of the captured scene as the scene content 224 obtained via reprojections using reprojection parameters

226. However, the scene content 248 may capture such portions of the scene using more pixels than the scene content 224. The scene content 248 may thus provide a magnified or zoomed representation of the portions of the captured scene within the overlap region 254.

In the example shown in FIG. 2, the scene content 224 (obtained using reprojection parameters 226) and/or the scene content 248 (obtained using alternative reprojection parameters 250) may be used to generate display output 260 for presentation on the display 200. The display output 260 may be constructed using various contributions from scene content 224 and/or scene content 248 (which are both obtained based on the same image data captured via the image sensor 202 for the same timepoint or timestamp). In some instances, the display output 260 is constructed using scene content 224 without scene content 248. In some instances, the display output 260 is constructed using scene content 248 without scene content 224. In some instances, the display output 260 is constructed using a combination of scene content 224 and scene content 248. For instance, FIG. 2 depicts an example in which the display output 260 includes different regions, including region 262 and region 266. Region 262 may depict portions of the captured environment at zoom level 264, which may provide an un-zoomed representation obtained from scene content 224. Region 266 may depict portions of the captured environment at zoom level 268, which may be different from (e.g., greater than) zoom level 264. Region 266 may thus provide a zoomed representation obtained from scene content 248.

To construct region 266 of the display output 260 (showing a zoomed representation), virtual display pixels of the virtual display panel 234 (and their corresponding pixel values depicting scene points) may be mapped to real display pixels of the display panel 206A. For example, FIG. 2 depicts a real display pixel 212A to which virtual display pixel 240 may be mapped, causing the pixel value associated with virtual display pixel 240 to be mapped to real display pixel 212A for presenting region 266.

Figure 3:
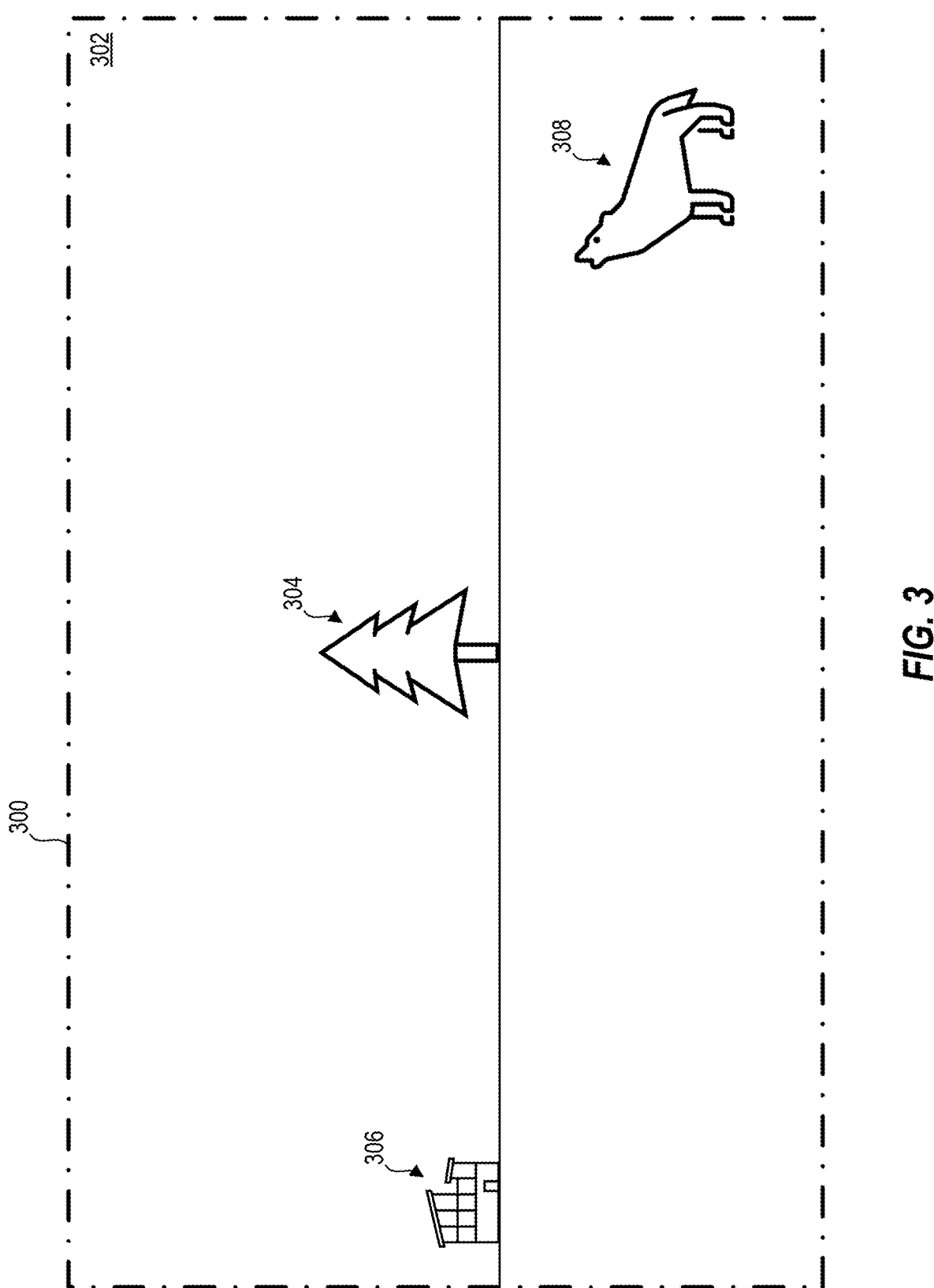
FIG. 3 illustrates a conceptual representation of a display showing display output represented at a first zoom level.
Figure 4:
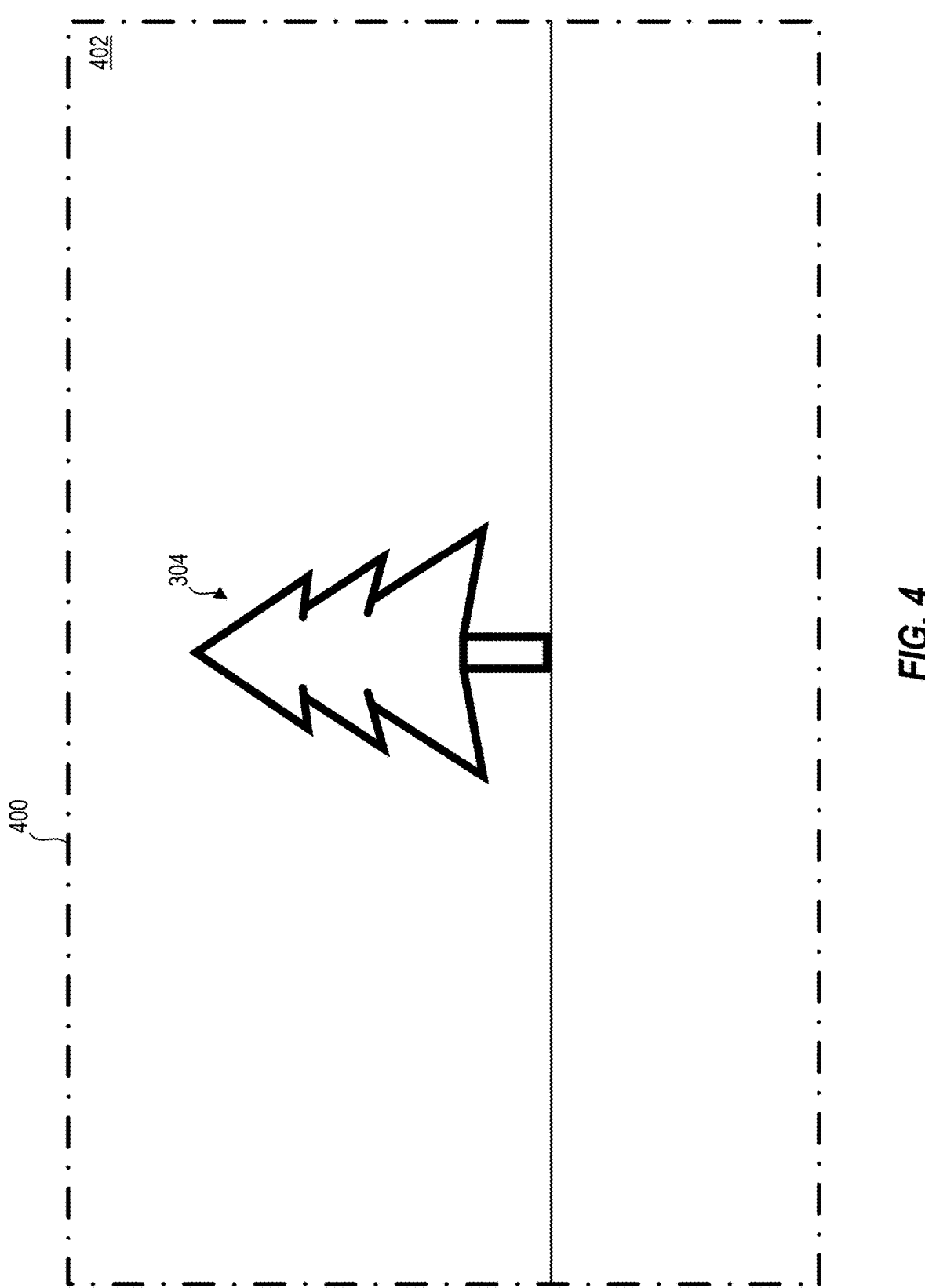
FIG. 4 illustrates a conceptual representation of a display showing display output represented at a second zoom level.

FIG. 3 illustrates a conceptual representation of a display 300 (e.g., corresponding to display 200) presenting display output (e.g., corresponding to display output 260) including a region 302 (e.g., corresponding to region 262) represented at a first zoom level (e.g., corresponding to zoom level 264). In the example shown in FIG. 3, the region 302 includes a representation of various objects, including a tree 304, a building 306, and an animal 308. FIG. 4 illustrates a conceptual representation of a display 400 (e.g., corresponding to display 200) showing display output (e.g., corresponding to display output 260) including a region 402 (e.g., corresponding to region 266) represented at a second zoom level (e.g., corresponding to zoom level 268). As described above, the regions 302 and 402 may be constructed based on the same image data captured for a single timepoint by the same image sensor (e.g., image sensor 202) using different reprojection parameters (e.g., reprojection parameters 226 and reprojection parameters 250, respectively). As shown in FIG. 4, the region 402 provides a zoomed representation of the tree 304 (while the building 306 and the animal 308 fall outside of the displayable field of view).

Figure 5:
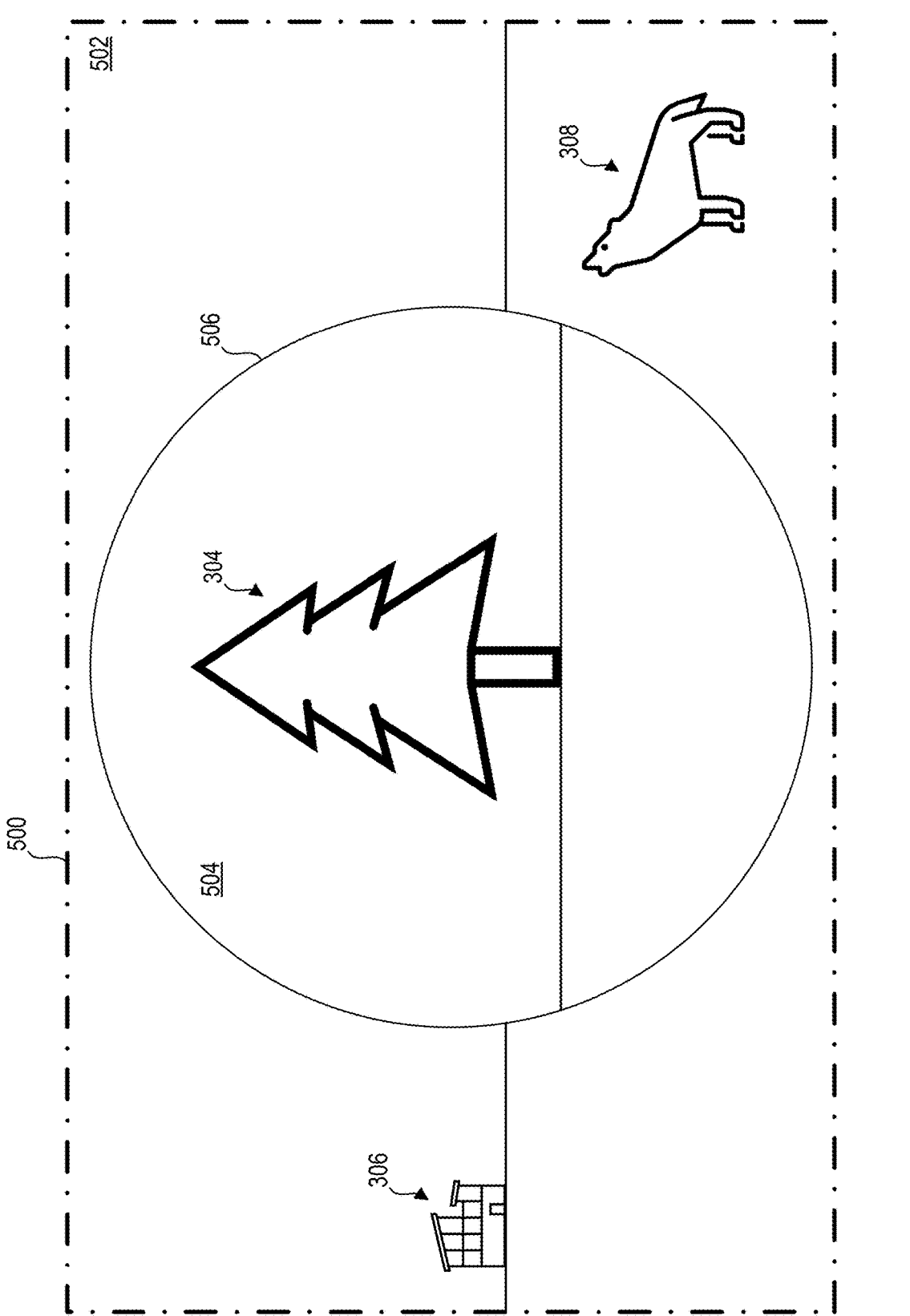
FIG. 5 illustrates a conceptual representation of a display showing display output represented at both a first zoom level and a second zoom level simultaneously.

FIG. 5 illustrates a conceptual representation of a display 500 (e.g., corresponding to display 200) showing display output (e.g., corresponding to display output 260) including a region 502 (e.g., corresponding to region 262) represented at the first zoom level (e.g., corresponding to zoom level 264) and a region 504 (e.g., corresponding to region 266) represented at the second zoom level (e.g., corresponding to zoom level 268). In the example shown in FIG. 5, regions 502 and 504 are separated by a boundary 506, with each of the regions 502 and 504 including a respective set of display pixels of the display 500. Although a circular boundary 506 is shown in FIG. 5, a boundary separating different regions of a display that depict scene content at different zoom levels may take on any shape. In the example shown in FIG. 5, region 504 includes a set of central pixels of the display 500, whereas region 502 includes a set of peripheral pixels of the display 500. Advantageously, such a configuration may allow users to maintain situational awareness of peripheral objects/events in region 502 while observing the details of objects in region 504. For instance, in contrast with display 400 showing region 402, which omits the building 306 and the animal 308, region 502 of display 500 shows both the building 306 and the animal 308, allowing the user to maintain some level of awareness of these objects while simultaneously being able to observe details of the tree 304 within region 504. However, other implementations are possible (e.g., where the position of the zoom region depends on user gaze location determined via eye tracking, the object of interest, etc.).

In the example shown in FIG. 5, region 504 depicts scene content (e.g., the tree 304) with 2× magnification relative to an un-zoomed representation thereof (e.g., as shown in region 302 of display 300 of FIG. 3). In some implementations, the magnification or zoom level of scene content shown in a zoom region (e.g., region 504) may be selectively modifiable or adjustable based on user input. For instance, a user may initially be presented with an un-zoomed pass-through view of an environment (e.g., shown via display 300 in FIG. 3), after which the user may provide user input (in any form) for triggering presentation of a zoom region (e.g., region 504 of FIG. 5). The user may then adjust the zoom level to increase or decrease the level of magnification within the zoom region. Each zoom level may be associated with a respective set of reprojection parameters (e.g., focal length and/or field of view) for performing the reprojection operations to determine the scene content to present for the selected zoom level.

To facilitate seamless pass-through user experiences, display output showing zoomed and/or un-zoomed representations of scene content (as described herein) may be generated in real time or near real time following acquisition of images capturing surrounding environments. For instance, following the capturing of one or more images of an environment for a particular timepoint, the display output may be generated (e.g., via reprojection processing as described above) and presented on the display within less than 1 second, less than 500 milliseconds, less than 100 milliseconds, less than 50 milliseconds, about 16.67 milliseconds, about 11.11 milliseconds, etc. Images of an environment may be captured in sequence to form a video stream of captured image content, and, correspondingly, display output may be generated and presented based on the video stream to provide a video stream of pass-through views of the environment (showing the environment at one or more different zoom levels) in near real time or in real time. In some embodiments, video frames for a pass-through video of an environment are generated at a rate of 20 frames per second (fps) or greater, 30 fps or greater, 60 fps or greater, 90 fps or greater, or at other rates. In some instances, use of a framerate below about 20 fps for pass-through video can cause significant temporal delays between the movements of real-world objects in the environment (relative to the system) and visual feedback for the user, which can cause users to improperly perceive and/or interact with their environment.

Figure 6:
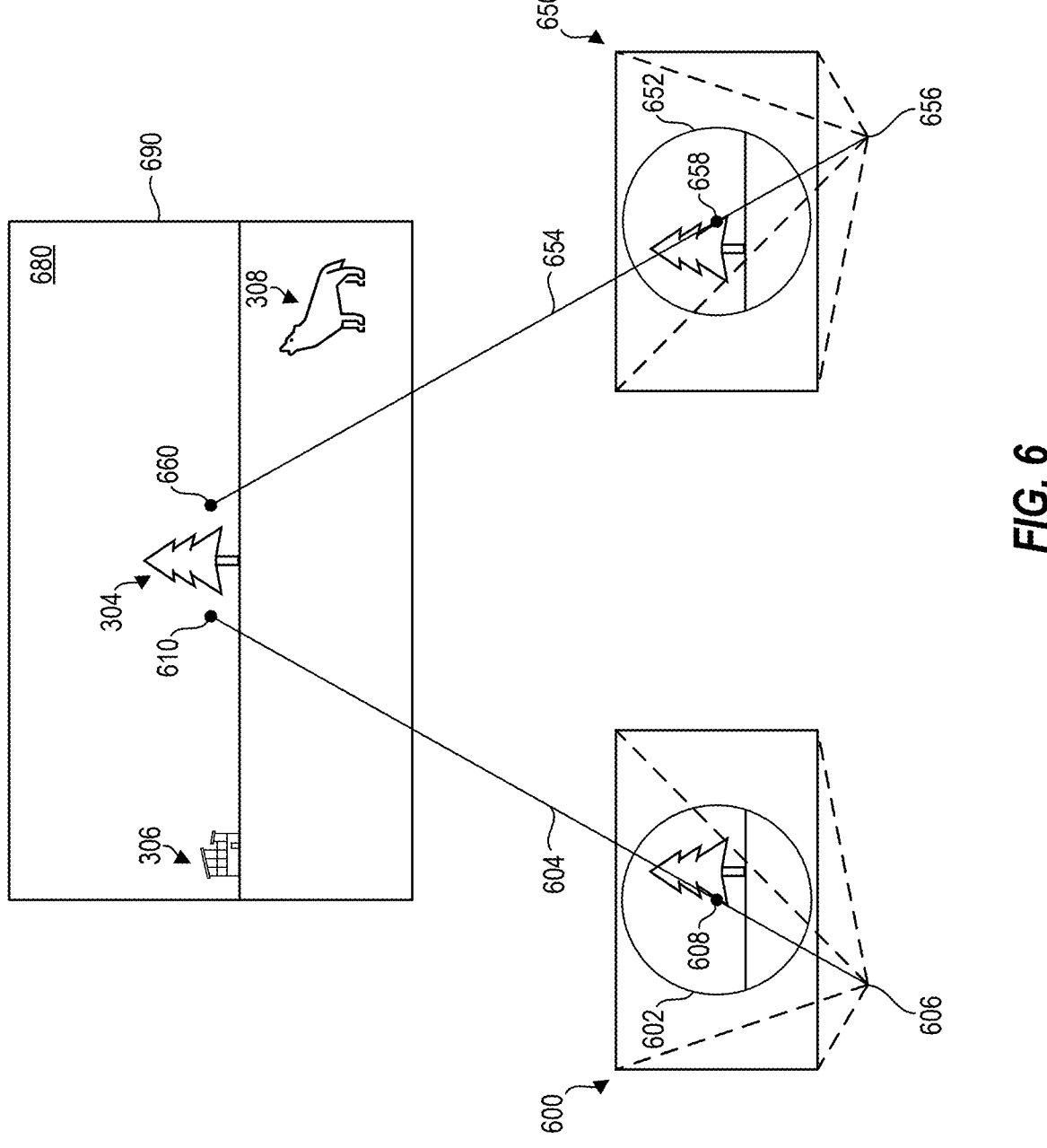
FIGS. 6 and 7 illustrate a conceptual representation of determining the locations for zoom regions for stereoscopic displays.

In some implementations, a system configured to provide zoomed representations of scene content (whether in combination with un-zoomed representations or not) includes multiple displays and multiple image sensors. FIG. 6 illustrates a conceptual representation of example displays 600 and 650, which may both be implemented on a single system (e.g., system 100, or an MR HMD) and may each be associated with a respective image sensor for acquisition of image data capturing an environment. The image data captured by each image sensor may provide a basis to determine scene content for presentation on the displays 600 and 650, whether zoomed or un-zoomed (e.g., using reprojection operations described hereinabove with reference to FIG. 2).

Each of the displays 600 and 650 may be arranged to become positioned in front of an eye of a user during use, thereby forming a set of stereoscopic displays. Where a system implements multiple displays configured to present zoomed representations of scene content, discrepancies may arise in the zoomed content shown on each display, which can lead to an inability of users to stereo fuse the presented imagery, rendering the zoom feature substantially unusable. Such discrepancies may result from differences in the intrinsics/properties of the displays, manufacturing tolerances in the positioning of the displays on the underlying system, and/or other factors. FIG. 6 illustrates an example in which displays 600 and 650 both provide a zoom region 602 and 652, respectively, showing zoomed representations of the environment 680 including the tree 304, the building 306, and the animal 308 as discussed above. The position of each of the zoom regions 602 and 652 on its corresponding display 600 or 650 is centered on the center display pixel(s) of the corresponding display 600 or 650. In the example shown in FIG. 6, the scene content shown in zoom region 602 of displays 600 centers on a left part of the tree 304, whereas the scene content shown in zoom region 652 centers on a right part of the tree 304, which can give rise to user discomfort and/or confusion when presented with the zoom regions 602 and 652.

Accordingly, the disclosed subject matter includes a geometry-aware method for determining the positioning of zoom regions on displays, which may mitigate discrepancies in the zoomed representations of content presented on stereoscopic displays. For instance, rather than centering the zoom regions for the different displays on the center pixel(s) of the displays, different zoom region centers may be determined for the different displays, and the different zoom region centers may be used when generating display output for presentation on the different displays.

Figure 7:
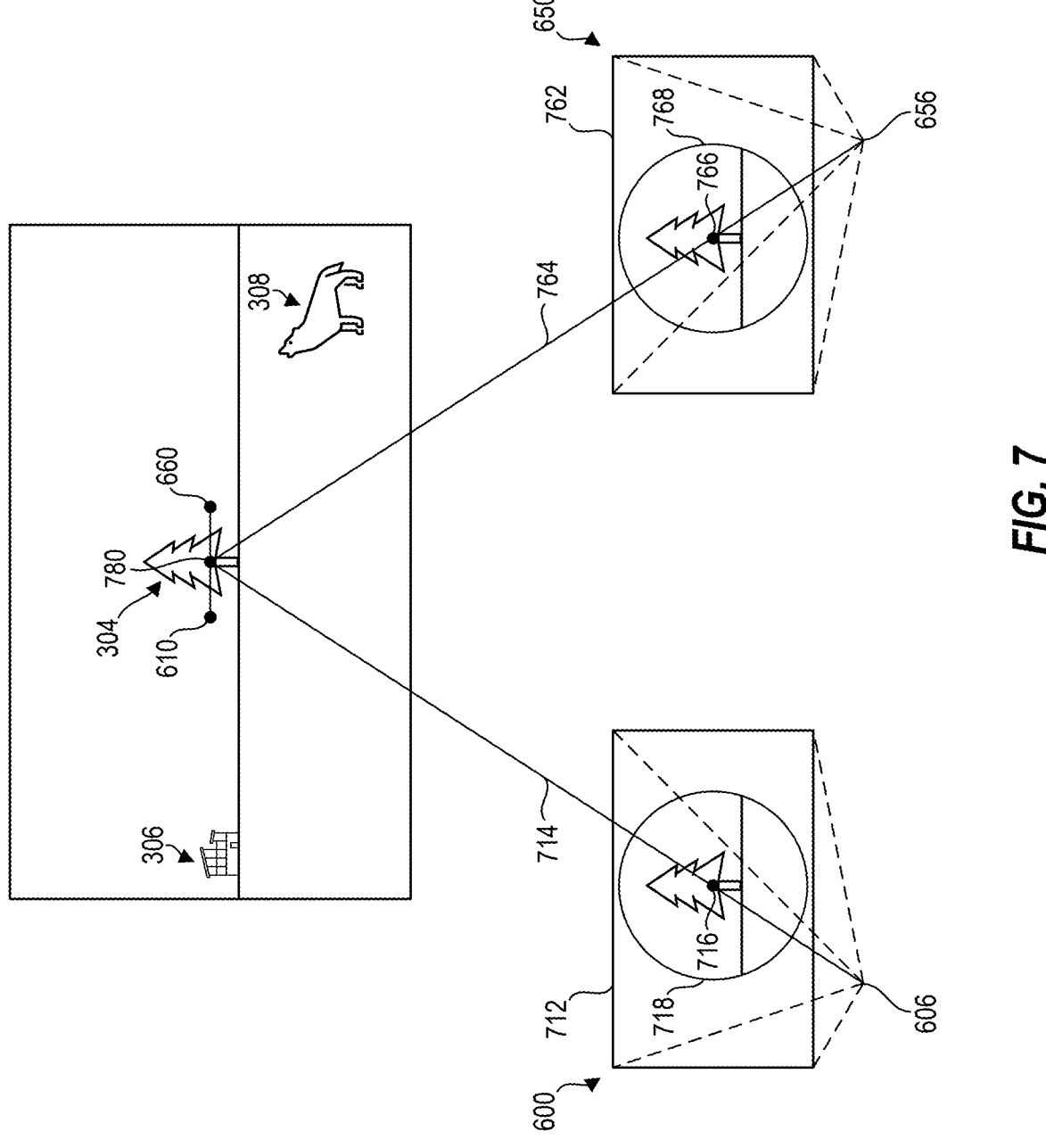

FIGS. 6 and 7 conceptually depict various operations associated with determining zoom region centers for different displays of a system. For instance, FIG. 6 depicts a ray 604 unprojected from the display center 606 of display 600 through the principal point 608 of the display 600. The principal point 608 may be known from the intrinsics/properties and/or calibration metrics of the display. In the example shown in FIG. 6, the ray 604 is unprojected to an intersection 610 with a virtual plane 690, which is positioned at a predetermined depth from the display 600 (or from the system on which displays 600 is implemented). In some instances, the virtual plane 690 corresponds to the predefined depth plane or parallax plane used for planar reprojection. FIG. 6 also illustrates a ray 654 unprojected from the display center 656 of display 650 through the principal point 658 of the display 650 to an intersection 660 with the virtual plane 690.

The intersections 610 and 660 of the rays 604 and 654 unprojected from the different displays 600 and 650 with the virtual plane 690 may be used as a basis to determine the positions of the zoom region centers for the different displays 600 and 650. For example, zoom region centers for the different displays 600 and 650 may be determined based on projections of a midpoint between intersections 610 and 660 onto the image planes of the different displays 600 and 650. FIG. 7 provides a conceptual representation of determining a midpoint 780 between the intersections 610 and 660. In the example shown in FIG. 7, the midpoint 780 is projected onto the image plane 712 (or display panel) of display 600 via ray 714, intersecting with a display pixel 716. The display pixel 716 may be used as the zoom region center for zoom regions presented on display 600. Similarly, FIG. 7 also depicts the midpoint 780 projected onto the image plane 762 (or display panel) of display 650 via ray 764, intersecting with a display pixel 766. The display pixel 766 may be used as the zoom region center for zoom regions presented on display 650.

By defining the zoom region centers for the different displays using a common point in 3D space (i.e., midpoint 780), zoom regions on the different displays 600 and 650 may display scene content with reduced or minimal spatial discrepancies. For example, after defining the zoom region centers for displays 600 and 650 (as described above), a system may capture a first image using the image sensor associated with display 600 and a second image using the image sensor associated with display 650. The system may then generate first display output for presentation on display 600, which will depict a zoomed representation of scene content. The first display output may be generated by performing reprojection operations (using a focal length that is longer than the real focal length for the corresponding image sensor) to determine scene content for display pixels that are part of a zoom region centered on the zoom region center for the display 600 (e.g., display pixel 716, as described above). FIG. 7 illustrates an example zoom region 718 presenting the first display output.

Similarly, the system may generate second display output for presentation on display 650, which will also depict a zoomed representation of scene content. The second display output may be generated by performing reprojection operations (using a focal length that is longer than the real focal length for the corresponding image sensor) to determine scene content for display pixels that are part of a zoom region centered on the zoom region center for the display 650 (e.g., display pixel 766, as described above). FIG. 7 also illustrates an example zoom region 768 presenting the second display output. As shown in FIG. 7, the zoom regions 718 and 768 of the different displays center on the same portion of the tree 304, which can facilitate improved usability of the zoom regions.

In some instances, the different zoom regions 718 and 768 for the different displays 600 and 650 can provide spatially aligned zoomed representations of scene content when the distance of the scene content from the displays 600 and 650 (or underlying system) is close to the distance of the virtual plane 690 from the displays 600 and 650 (or underlying system). Accordingly, to provide spatially aligned representations of scene content positioned at different distances from the system, a system may determine multiple different zoom region centers for each of the displays 600 and 650 using different virtual plane depths/distances (e.g., still following the steps of unprojecting from each display through its principal point to an intersection with the virtual plane and projecting the midpoint between the intersections onto each display to determine the display pixels to use as the zoom region centers of the different displays). The system may then accommodate user selection of different zoom region centers to use for different distances of scene content from the system (e.g., similar to the user selection of different zoom levels as described above).

Multi-Region Tone Mapping

Figure 8:
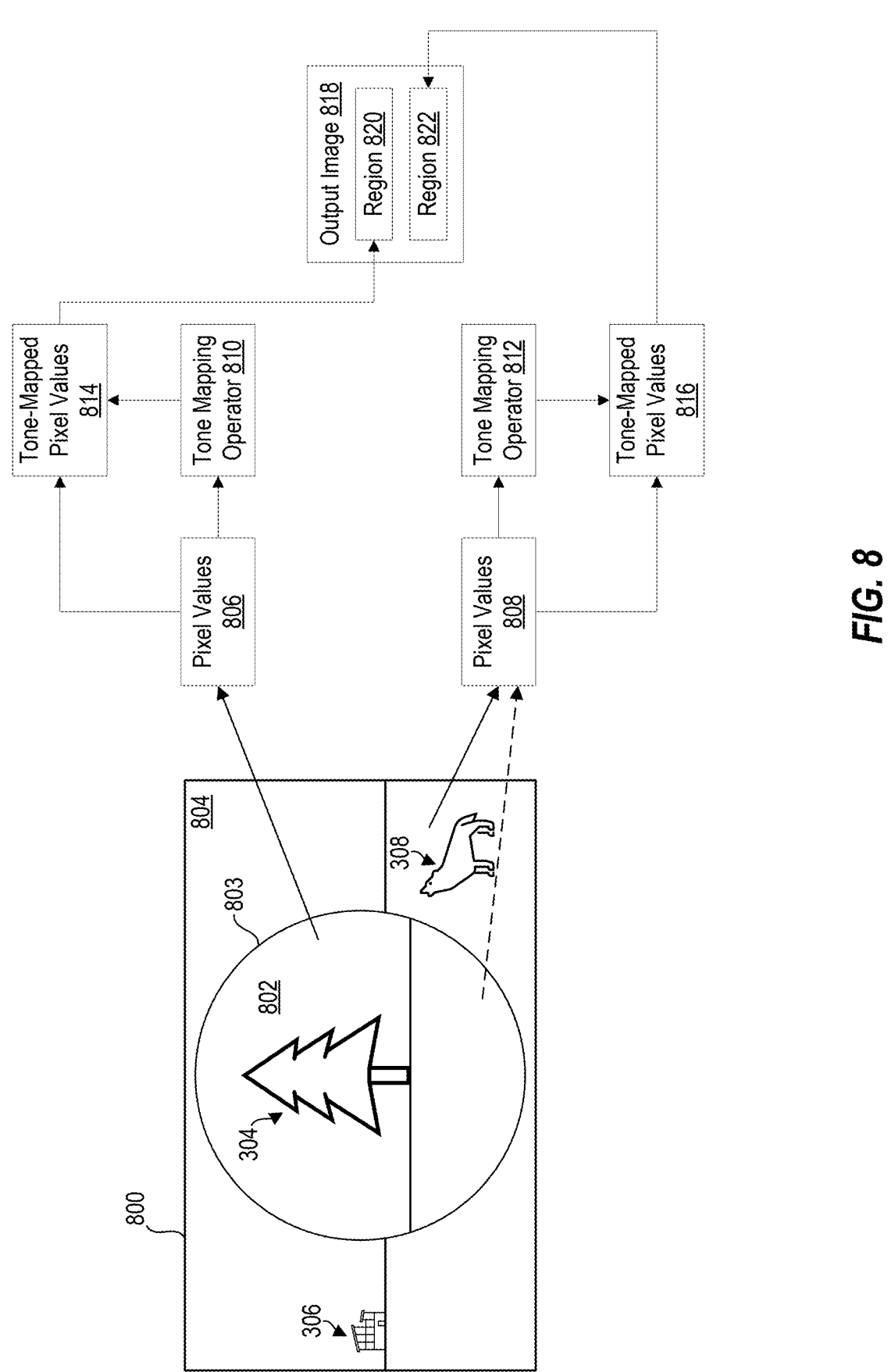
FIGS. 8 and 9 illustrate conceptual representations of determining tone-mapped pixel values for different regions of output imagery.
Figure 9:
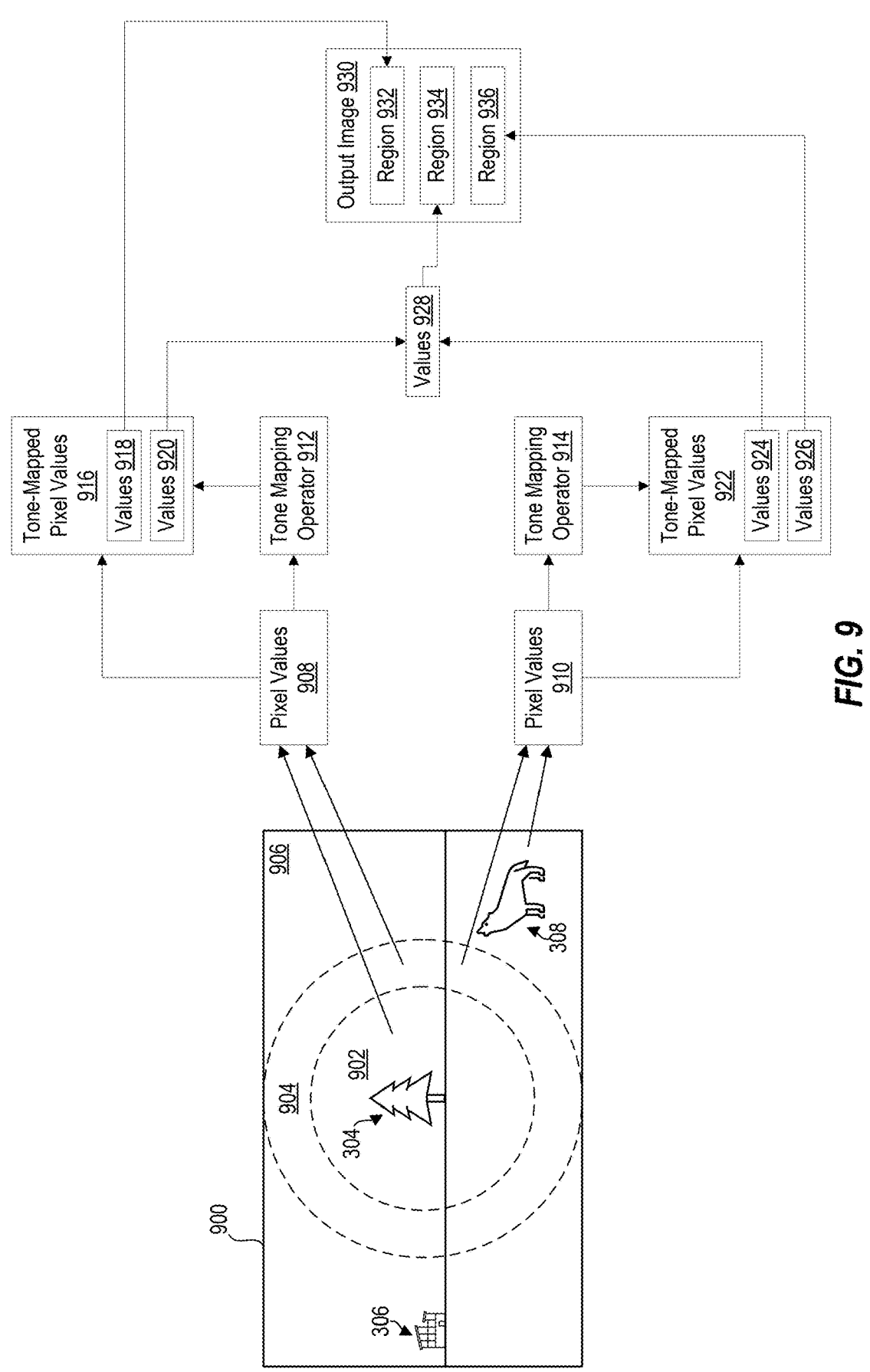

FIGS. 8 and 9 illustrate conceptual representations of determining tone-mapped pixel values for different regions of output imagery. For instance, FIG. 8 illustrates an image 800 (e.g., a pass-through image, which may correspond to display output as described above) of the environment that includes the tree 304, the building 306, and the animal 308. In the example shown in FIG. 8, the image 800 includes a zoomed region 802 (depicting the tree 304) and an un-zoomed region 804 (depicting the building 306 and the animal 308). As shown in FIG. 8, the zoomed region 802 includes a set of central pixels of the image 800, whereas the un-zoomed region 804 includes a set of peripheral pixels of the image 800 (which are separated from one another by a boundary 803). The zoomed region 802 and the un-zoomed region 804 may be generated using techniques described hereinabove with reference to FIGS. 2-7. As noted above, conventional tone mapping methods can provide sub-optimal results when applied to images that include zoomed regions and un-zoomed regions. For instance, if the animal 308 is represented in the image 800 with high pixel values (e.g., intensity values or photon counts/levels), the building 306 is represented in the image 800 with low pixel values, and the tree is represented in the image 800 with intermediate pixel values, applying conventional tone mapping methods to the image 800 to generate an output image may cause the output image to depict the tree 304 with low contrast, which can undermine the user's ability to interpret details of the tree 304 within the zoomed region 802.

Disclosed embodiments include multi-region tone mapping techniques that can preserve contrast in different image regions (e.g., zoomed and un-zoomed regions), as conceptually depicted in FIG. 8. FIG. 8 illustrates a set of pixel values 806, which includes pixel values associated with the pixels that form the zoomed region 802 (indicated by the arrow extending from the zoomed region 802 to the set of pixel values 806). FIG. 8 also illustrates a set of pixel values 808, which includes pixel values associated with the pixels that form the un-zoomed region 804 (indicated by the arrow extending from the un-zoomed region 804 to the set of pixel values 808). In the example shown in FIG. 8, pixel values 806 are used to generate a tone mapping operator 810 (indicated by the arrow extending from set of pixel values 806 to tone mapping operator 810), and pixel values 808 are used to generate a separate tone mapping operator 812 (indicated by the arrow extending from set of pixel values 808 to tone mapping operator 812).

The tone mapping operators 810 and 812 may be generated in various ways using their respective input sets of pixel values 806 and 808, such as histogram equalization, histogram normalization, linear mapping, gamma correction, logarithmic mapping, sigmoid mapping, percentile-based approaches, and/or others. In one example, the tone mapping operators 810 and 812 are generated by building a histogram of their respective input sets of pixel values 806 and 808. Pixel statistics are then computed from the histograms (e.g., the $50^{th}$ and $95^{th}$ percentile pixel values), which are then converted to the medium and high gain parameters that represent scale factors for medium and high value pixels (e.g., intensity values). The medium and high gain parameters are then input to a function that fits an S-shaped curve to the medium and high gain values. The function returns a lookup table that serves as the tone mapping operator 810 or 812 by establishes a mapping from input pixel values (e.g., float-valued photon counts/levels, or other values) to output values (or tone-mapped pixel values).

FIG. 8 conceptually depicts applying the tone mapping operator 810 to the set of pixel values 806 to obtain tone-mapped pixel values 814 (indicated by arrows extending from both the tone mapping operator 810 and the set of pixel values 806 to the tone-mapped pixel values 814). FIG. 8 also conceptually depicts applying the tone mapping operator 812 to the set of pixel values 808 to obtain tone-mapped pixel values 816 (indicated by arrows extending from both the tone mapping operator 812 and the set of pixel values 808 to the tone-mapped pixel values 816). The different tone-mapped pixel values 814 and 816 may be used to construct an output image 818 which may include different regions 820 and 822. For instance, tone-mapped pixel values 814 may be used to define pixel values within region 820 of the output image 818, whereas tone-mapped pixel values 816 may be used to define pixel values within region 822 of the output image 818. Similar to zoomed region 802, region 820 may provide a zoomed representation of scene content, and, similar to un-zoomed region 804, region 822 may provide an un-zoomed representation of scene content.

In some instances, by omitting the periphery pixel values within un-zoomed region 804 when determining the tone mapping operator 810 for defining the tone-mapped pixel values 814 for region 820, contrast may be preserved within region 820 of the output image 818, even when intensity disparities exist for objects depicted in the un-zoomed region 804. Similarly, by omitting the central pixel values within the zoomed region 802 when determining the tone mapping operator 812 for defining the tone-mapped pixel values 816 for region 822, contrast may be preserved within region 822 of the output image 818, even when intensity disparities exist for objects depicted in the zoomed region 802.

The output image 818 may be presented on a display as described hereinabove to provide pass-through views of the environment to users, and a series of output images may be presented to provide pass-through video of the environment. As with the generation of the display output described above with reference to FIGS. 2-7, an output image 818 (or series of output images) may be generated and/or presented on a display after acquisition of an image of an environment in real time or near real time (e.g., within less than 1 second, less than 500 milliseconds, less than 100 milliseconds, less than 50 milliseconds, about 16.67 milliseconds, about 11.11 milliseconds, etc.).

Although the example described above with reference to FIG. 8 utilizes the pixels of the un-zoomed region 804 to define the set of pixel values 808 for determining the tone mapping operator 812, the set of pixel values 808 used to determine the tone mapping operator 812 may additionally utilize the pixels from the zoomed region 802 (as indicated in FIG. 8 by the dashed arrow extending from the zoomed region 802 to the set of pixel values 808). In such cases, the tone mapping operator 812 may still only be applied to the pixel values from the un-zoomed region 804 to obtain the tone-mapped pixel values 816 (e.g., without applying the tone mapping operator 812 to the pixel values from the zoomed region 802). In some instances, utilizing both the zoomed region 802 and the un-zoomed region 804 to define the set of pixel values 808 for determining the tone mapping operator 812 can help avoid abrupt changes to the presentation of the scene content in the un-zoomed region 804 when transitioning into and out of a zoom mode during user experiences.

In the example shown and described with reference to FIG. 8, the set of pixel values 806 and the set of pixel values 808 are associated with different zoom levels and are used to generate different tone mapping operators 810 and 812, respectively, for generating different regions of the output image 818. However, in some implementations, different sets of pixel values associated with the same zoom level may be used to generate different tone mapping operators for generating different regions of the output image. Such functionality can enable tone mapping in a manner that preserves contrast within the central region of the output imagery (which often corresponds with the region of interest for the user), regardless of whether a zoomed representation is provided.

In some implementations of the disclosed subject matter, blended tone mapping is facilitated at a transition region between a peripheral region and a central region to mitigate abrupt visual differences in how scene content is portrayed in different regions. For instance, FIG. 9 illustrates an image 900 (e.g., a pass-through image, which may correspond to display output as described above) of the environment that includes the tree 304, the building 306, and the animal 308. In the example shown in FIG. 9, the image 900 provides an un-zoomed representation of the scene content, which may be generated using techniques described hereinabove with reference to FIGS. 2-7. FIG. 9 illustrates the image 900 as including a first region 902, a second region 906, and a third region 904. In the example shown in FIG. 9, the first region 902 includes central pixels of the image 900, the second region 906 includes peripheral pixels of the image 900, and the third region 904 includes pixels within a transition region between the first region 902 and the second region 906 (though other configurations are possible).

FIG. 9 illustrates a set of pixel values 908 that includes pixel values associated with the pixels from both the first region 902 and the third region 904 (indicated by the arrows extending from both the first region 902 and the third region 904 to the set of pixel values 908). FIG. 9 also illustrates a set of pixel values 910 that includes pixel values associated with the pixels from both the third region 904 and the second region 906 (indicated by the arrows extending from both the third region 904 and the second region 906 to the set of pixel values 910). In this regard, the third region 904 may be defined as including pixels whose values are included in both the set of pixel values 908 and the set of pixel values 910.

In the example shown in FIG. 9, the set of pixel values 908 is used to generate a tone mapping operator 912 (indicated by the arrow extending from the set of pixel values 908 to the tone mapping operator 912), and the set of pixel values 910 is used to generate a separate tone mapping operator 914 (indicated by the arrow extending from the set of pixel values 910 to the tone mapping operator 914). Similar to tone mapping operators 810 and 812 described above, tone mapping operators 912 and 914 may be generated in various ways and/or using various techniques.

FIG. 9 further conceptually depicts applying tone mapping operator 912 to the set of pixel values 908 to obtain tone-mapped pixel values 916 (indicated by arrows extending from both the tone mapping operator 912 and the set of pixel values 908 to the tone-mapped pixel values 916). In the example shown in FIG. 9, the tone-mapped pixel values 916 generated using the tone mapping operator 912 include two sets of tone-mapped pixel values, including tone-mapped pixel values 918 and tone-mapped pixel values 920. Tone-mapped pixel values 918 are obtained by applying the tone mapping operator 912 to the pixel values of pixels from the first region 902, whereas tone-mapped pixel values 920 are obtained by applying the tone mapping operator 912 to the pixel values of pixels from the third region 904. Similarly, FIG. 9 conceptually depicts applying tone mapping operator 914 to the set of pixel values 910 to obtain tone-mapped pixel values 922 (indicated by arrows extending from both the tone mapping operator 914 and the set of pixel values 910 to the tone-mapped pixel values 922). In the example shown in FIG. 9, the tone-mapped pixel values 922 generated using the tone mapping operator 914 include two sets of tone-mapped pixel values, including tone-mapped pixel values 924 and tone-mapped pixel values 926. Tone-mapped pixel values 924 are obtained by applying the tone mapping operator 914 to the pixel values of pixels from the third region 904, whereas tone-mapped pixel values 926 are obtained by applying the tone mapping operator 914 to pixel values of pixels from the second region 906. In some instances, a system may refrain from applying tone mapping operator 914 to pixel values of pixels from the first region 902 and may refrain from applying tone mapping operator 912 to pixel values of pixels from the second region 906.

As indicated above, both tone mapping operators 912 and 914 may be used to generate sets of tone-mapped pixel values 920 and 924, respectively, for pixel values of pixels from the third region 904 of the image 900. FIG. 9 conceptually depicts both of these sets of tone-mapped pixel values 920 and 924 being combined to generate a (final or combined) set of tone-mapped pixel values 928 representing the pixel values of pixels from the third region 904 of the image 900 (e.g., the transition region) (indicated in FIG. 9 by the arrows extending from both tone-mapped pixel values 920 and tone-mapped pixel values 924 toward the set of tone-mapped pixel values 928). In one example, for each pixel location within the third region 904, the corresponding final tone-mapped pixel value for the set of tone-mapped pixel values 928 may be defined as the weighted average (or other combination) of the pixel value at the same pixel location from the set of tone-mapped pixel values 920 and from the set of tone-mapped pixel values 924. In some instances, the weights used for the weighted averaging of tone-mapped pixel values from the different sets of tone-mapped pixel values 920 and 924 are determined based on pixel location. For instance, weights for pixel locations within the third region 904 that are closer to the first region 902 (e.g., closer to the central region) may indicate a greater contribution from the tone-mapped pixel value of the set of tone-mapped pixel values 920 (generated using tone mapping operator 912) to the combined tone-mapped pixel value in the final or combined set of tone-mapped pixel values 928. Similarly, weights for pixel locations within the third region 904 that are closer to the second region 906 (e.g., closer to the peripheral region) may indicate a greater contribution from the tone-mapped pixel value of the tone-mapped pixel values 924 (generated using tone mapping operator 914) to the combined tone-mapped pixel value in the final or combined set of tone-mapped pixel values 928. Other methods of combining the different sets of tone-mapped pixel values 920 and 924 generated using different tone mapping operators 912 and 914, respectively, to obtain the (final or combined) set of tone-mapped pixel values 928 may be implemented in accordance with the disclosed principles.

In the example shown in FIG. 9, the sets of tone-mapped pixel values 918, 926, and 928 are used to generate an output image 930. The output image 930 may include different regions corresponding to the regions of the image 900 discussed above. For instance, region 932 of the output image 930 may comprise central pixels similar to the first region 902 of the image 900, region 936 of the output image 930 may comprise peripheral pixels similar to the second region 906 of the image 900, and region 934 may comprise pixels within a transition region between regions 932 and 936 similar to the third region 904 of the image 900. FIG. 9 conceptually depicts the set tone-mapped pixel values 918 being used to define pixel values for region 932 of the output image 930 (via an arrow extending from the set of tone-mapped pixel values 918 to region 932). FIG. 9 further conceptually depicts the set of tone-mapped pixel values 926 being used to define pixel values for region 936 of the output image 930 (via an arrow extending from the set of tone-mapped pixel values 926 to region 936). FIG. 9 also conceptually depicts the set of tone-mapped pixel values 928 being used to define pixel values for region 934 of the output image 930. In some instances, blending/combining tone-mapped pixel values generated using different tone mapping operators for transition regions in output imagery can mitigate abrupt visual differences in how scene content is portrayed in different regions of the output imagery.

The output image 930 may be presented on a display to provide pass-through views of the environment to users, and a series of output images may be presented to provide pass-through video of the environment. An output image 930 (or series of output images) may be generated and/or presented on a display after acquisition of an image of an environment in real time or near real time (e.g., within less than 1 second, less than 500 milliseconds, less than 100 milliseconds, less than 50 milliseconds, about 16.67 milliseconds, about 11.11 milliseconds, etc.).

Example Method(s)

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

FIGS. 10-15 illustrate example flow diagrams 1000, 1100, 1200, 1300, 1400, and 1500, respectively, depicting acts associated with the disclosed subject matter. The acts described with reference to FIGS. 10-15 can be performed using one or more components of one or more systems 100 described hereinabove with reference to FIG. 1, such as processor(s) 102, storage 104, sensor(s) 110, I/O system(s) 114, communication system(s) 116, remote system(s) 118, etc.

Act 1002 of flow diagram 1000 of FIG. 10 includes capturing one or more images using one or more image sensors. In some implementations, the one or more images comprise a single image.

Act 1004 of flow diagram 1000 includes generating display output for presentation on one or more displays, wherein the display output comprises at least a first region and a second region, wherein the first region depicts first scene content represented in the one or more images with a first zoom level, and wherein the second region depicts second scene content represented in the one or more images with a second zoom level, wherein the second zoom level is different from the first zoom level. In some instances, the first zoom level is higher than the second zoom level. In some implementations, generating the display output for presentation on the one or more displays comprises: (i) determining the first scene content for the first region of the display output by performing a first set of reprojection operations from the one or more displays to the one or more image sensors using a first set of reprojection parameters; and (ii) determining the second scene content for the second region of the display output by performing a second set of reprojection operations from the one or more displays to the one or more image sensors using a second set of reprojection parameters, wherein the second set of reprojection parameters is different from the first set of reprojection parameters. In some instances, the first set of reprojection parameters uses a first focal length that is longer than a real focal length associated with the one or more image sensors, and the second set of reprojection parameters uses a second focal length that corresponds to the real focal length associated with the one or more image sensors.

Act 1006 of flow diagram 1000 includes presenting the display output using the one or more displays, wherein, upon capturing the one or more images, generating the display output and presenting the display output occurs in real time or near real time. In some embodiments, presenting the display output using the one or more displays comprises: (i) presenting the first region of the display output on a first set of display pixels of the one or more displays; and (ii) presenting the second region of the display output on a second set of display pixels of the one or more displays. In some examples, the first set of display pixels comprises a set of central pixels of the one or more displays, and the second set of display pixels comprises a set of peripheral pixels of the one or more displays.

Act 1102 of flow diagram 1100 of FIG. 11 includes capturing one or more images using one or more image sensors.

Act 1104 of flow diagram 1100 includes generating display output for presentation on one or more displays, wherein the display output comprises at least a first region, wherein the first region depicts first scene content represented in the one or more images with a first zoom level, wherein generating the display output comprises determining the first scene content for the first region of the display output by performing a first set of reprojection operations from the one or more displays to the one or more image sensors using a first set of reprojection parameters, wherein the first set of reprojection parameters uses a first focal length that is longer than a real focal length associated with the one or more image sensors. In some instances, the first zoom level is selectively modifiable based on user input. In some implementations, the display output further comprises a second region. In some embodiments, the second region depicts second scene content represented in the one or more images with a second zoom level. In some examples, the second zoom level is different from the first zoom level (e.g., the first zoom level may be higher than the second zoom level). In some instances, generating the display output further comprises determining the second scene content for the second region of the display output by performing a second set of reprojection operations from the one or more displays to the one or more image sensors using a second set of reprojection parameters, where the second set of reprojection parameters is different from the first set of reprojection parameters. In some embodiments, the second set of reprojection parameters uses a second focal length that corresponds to the real focal length associated with the one or more image sensors.

Act 1106 of flow diagram 1100 includes presenting the display output using the one or more displays. In some implementations, upon capturing the one or more images, generating the display output and presenting the display output occurs in real time or near real time. In some embodiments, presenting the display output using the one or more displays comprises: (i) presenting the first region of the display output on a first set of display pixels of the one or more displays; and (ii) presenting the second region of the display output on a second set of display pixels of the one or more displays. In some examples, the first set of display pixels comprises a set of central pixels of the one or more displays, and the second set of display pixels comprises a set of peripheral pixels of the one or more displays.

Act 1202 of flow diagram 1200 of FIG. 12 includes unprojecting a first ray from a first display center associated with a first display through a first principal point associated with the first display.

Act 1204 of flow diagram 1200 includes determining a first intersection of the first ray with a virtual plane, the virtual plane being arranged at a predetermined depth from a first image sensor and a second image sensor.

Act 1206 of flow diagram 1200 includes unprojecting a second ray from a second display center associated with a second display through a second principal point associated with the second display.

Act 1208 of flow diagram 1200 includes determining a second intersection of the second ray with the virtual plane.

Act 1210 of flow diagram 1200 includes determining a midpoint between the first intersection and the second intersection on the virtual plane.

Act 1212 of flow diagram 1200 includes defining a first zoom region center for the first display by projecting the midpoint onto an image plane of the first display.

Act 1214 of flow diagram 1200 includes defining a second zoom region center for the second display by projecting the midpoint onto an image plane of the second display.

Act 1216 of flow diagram 1200 includes capturing a first image using the first image sensor.

Act 1218 of flow diagram 1200 includes capturing a second image using the second image sensor.

Act 1220 of flow diagram 1200 includes generating first display output for presentation on the first display, wherein the first display output comprises at least a first region, wherein the first region depicts first scene content represented in the first image with a first zoom level, wherein generating the first display output comprises determining the first scene content for the first region of the first display output by performing a first set of reprojection operations from the first display to the first image sensor using a first set of reprojection parameters, wherein the first set of reprojection parameters uses a first focal length that is longer than a first real focal length associated with the first image sensor.

Act 1222 of flow diagram 1200 includes generating second display output for presentation on the second display, wherein the second display output comprises at least a second region, wherein the second region depicts second scene content represented in the second image with the first zoom level, wherein generating the second display output comprises determining the second scene content for the second region of the second display output by performing a second set of reprojection operations from the second display to the second image sensor using a second set of reprojection parameters, wherein the second set of reprojection parameters uses a second focal length that is longer than a second real focal length associated with the second image sensor.

Act 1224 of flow diagram 1200 includes presenting the first display output on the first display, wherein the first region is centered on the first zoom region center.

Act 1226 of flow diagram 1200 includes presenting the second display output on the second display, wherein the second region is centered on the second zoom region center. In some embodiments, the first zoom region center and the second zoom region center used for presenting the first display output on the first display and the second display output on the second display are selected from a plurality of zoom region center pairs for the first display and the second display, where each of the plurality of zoom region center pairs is determined using a different predetermined depth for the virtual plane.

Act 1302 of flow diagram 1300 of FIG. 13 includes obtaining one or more images using one or more image sensors, wherein the one or more images includes a first set of pixels and a second set of pixels. In some examples, the first set of pixels comprises a set of central pixels of the one or more images. In some instances, the second set of pixels comprises a set of peripheral pixels of the one or more images. In some implementations, the first set of pixels depicts first scene content with a first zoom level, and the second set of pixels depicts second scene content with a second zoom level. In some embodiments, the first zoom level is higher than the second zoom level. In some examples, the first set of pixels and the second set of pixels depict scene content with the same zoom level.

Act 1304 of flow diagram 1300 includes generating a first tone mapping operator using a first set of pixel values associated with the first set of pixels.

Act 1306 of flow diagram 1300 includes generating a second tone mapping operator using the first set of pixel values and a second set of pixel values associated with the second set of pixels.

Act 1308 of flow diagram 1300 includes generating a first set of tone-mapped pixel values by applying the first tone mapping operator to the first set of pixel values.

Act 1310 of flow diagram 1300 includes generating a second set of tone-mapped pixel values by applying the second tone mapping operator to the second set of pixel values.

Act 1312 of flow diagram 1300 includes refraining from applying the first tone mapping operator to at least some of the second set of pixel values and to refrain from applying the second tone mapping operator to at least some of the first set of pixel values.

Act 1314 of flow diagram 1300 includes generating an output image using the first set of tone-mapped pixel values and the second set of tone-mapped pixel values. In some implementations, upon obtaining the one or more images, generating the output image occurs in real time or near real time.

Act 1402 of flow diagram 1400 of FIG. 14 includes obtaining one or more images using one or more image sensors, wherein the one or more images includes a first set of pixels, a second set of pixels, and a third set of pixels, wherein the third set of pixels includes pixels that are included in both the first set of pixels and the second set of pixels. In some embodiments, the first set of pixels comprises a set of central pixels of the one or more images. In some examples, the second set of pixels comprises a set of peripheral pixels of the one or more images. In some instances, the third set of pixels comprises pixels within a transition region between the set of central pixels and the set of peripheral pixels. In some implementations, the first set of pixels and the second set of pixels depict scene content with a same zoom level.

Act 1404 of flow diagram 1400 includes generating a first tone mapping operator using a first set of pixel values associated with the first set of pixels.

Act 1406 of flow diagram 1400 includes generating a second tone mapping operator using at least a second set of pixel values associated with the second set of pixels.

Act 1408 of flow diagram 1400 includes generating a first set of tone-mapped pixel values by applying the first tone mapping operator to the first set of pixel values.

Act 1410 of flow diagram 1400 includes generating a second set of tone-mapped pixel values by applying the second tone mapping operator to the second set of pixel values.

Act 1412 of flow diagram 1400 includes generating a third set of tone-mapped pixel values by combining tone-mapped pixel values from the first set of tone-mapped pixel values and the second set of tone-mapped pixel values. In some embodiments, the third set of tone-mapped pixel values is generated by determining weighted averages of tone-mapped pixel values from the first set of tone-mapped pixel values and the second set of tone-mapped pixel values. In some examples, weights for the weighted averages of tone-mapped pixel values from the first set of tone-mapped pixel values and the second set of tone-mapped pixel values are based on pixel location.

Act 1414 of flow diagram 1400 includes refraining from applying the first tone mapping operator to at least some of the second set of pixel values and to refrain from applying the second tone mapping operator to at least some of the first set of pixel values.

Act 1416 of flow diagram 1400 includes generating an output image using the first set of tone-mapped pixel values, the second set of tone-mapped pixel values, and the third set of tone-mapped pixel values. In some implementations, upon obtaining the one or more images, generating the output image occurs in real time or near real time.

Act 1502 of flow diagram 1500 of FIG. 15 includes obtaining one or more images using one or more image sensors, wherein the one or more images includes a first set of pixels and a second set of pixels. In some instances, the first set of pixels comprises a set of central pixels of the one or more images, and the second set of pixels comprises a set of peripheral pixels of the one or more images. In some examples, the first set of pixels depicts first scene content with a first zoom level, and wherein the second set of pixels depicts second scene content with a second zoom level.

Act 1504 of flow diagram 1500 includes generating a first tone mapping operator using a first set of pixel values associated with the first set of pixels.

Act 1506 of flow diagram 1500 includes generating a second tone mapping operator using at least a second set of pixel values associated with the second set of pixels.

Act 1508 of flow diagram 1500 includes generating a first set of tone-mapped pixel values by applying the first tone mapping operator to the first set of pixel values.

Act 1510 of flow diagram 1500 includes generating a second set of tone-mapped pixel values by applying the second tone mapping operator to the second set of pixel values.

Act 1512 of flow diagram 1500 includes generating an output image using the first set of tone-mapped pixel values and the second set of tone-mapped pixel values.

Act 1514 of flow diagram 1500 includes presenting the output image on the one or more displays, wherein, upon obtaining the one or more images, generating and presenting the output image occurs in real time or near real time.

Additional Details Related to the Disclosed Embodiments

Disclosed embodiments may comprise or utilize a special-purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "computer-readable recording media", "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry program code in the form of computer-executable instructions or data structures, and which can be accessed by a general-purpose or special-purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

As used herein, the term "about", when used to modify a numerical value or range, refers to any value within 5%, 10%, 15%, 20%, or 25% of the numerical value modified by the term "about".

The present invention may be embodied in other specific forms without departing from its spirit or characteristics.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

We claim:

1. A system for providing zoomed representations of scene content, comprising:
  an image sensor;
  one or more displays;
  one or more processors; and
  one or more computer-readable recording media that store instructions that are executable by the one or more processors to configure the system to:
    capture an image using the image sensor;
    generate display output for presentation on the one or more displays, wherein the display output comprises at least a first region generated by processing the image and a second region generated by processing the image, wherein the first region depicts first scene content represented in the image with a first zoom level, and wherein the second region depicts second scene content represented in the image with a second zoom level, wherein the second zoom level is different from the first zoom level; and
    present the display output using the one or more displays, wherein, upon capturing the image, generating the display output and presenting the display output occurs in real time or near real time.

2. The system of claim 1, wherein the first zoom level is higher than the second zoom level.

3. The system of claim 1, wherein presenting the display output using the one or more displays comprises:
  presenting the first region of the display output on a first set of display pixels of the one or more displays; and
  presenting the second region of the display output on a second set of display pixels of the one or more displays.

4. The system of claim 3, wherein the first set of display pixels comprises a set of central pixels of the one or more displays, and wherein the second set of display pixels comprises a set of peripheral pixels of the one or more displays.

5. The system of claim 1, wherein generating the display output for presentation on the one or more displays comprises:
  determining the first scene content for the first region of the display output by performing a first set of reprojection operations from the one or more displays to the image sensor using a first set of reprojection parameters; and
  determining the second scene content for the second region of the display output by performing a second set of reprojection operations from the one or more displays to the image sensor using a second set of reprojection parameters, wherein the second set of reprojection parameters is different from the first set of reprojection parameters.

6. The system of claim 5, wherein the first set of reprojection parameters uses a first focal length that is longer than a real focal length associated with the image sensor, and wherein the second set of reprojection parameters uses a second focal length that corresponds to the real focal length associated with the image sensor.

7. A system for providing zoomed representations of scene content, comprising:
  one or more image sensors;
  one or more displays;
  one or more processors; and
  one or more computer-readable recording media that store instructions that are executable by the one or more processors to configure the system to:
    capture one or more images using the one or more image sensors;
    generate display output for presentation on the one or more displays, wherein the display output comprises at least a first region, wherein the first region depicts first scene content represented in the one or more images with a first zoom level, wherein generating the display output comprises determining the first scene content for the first region of the display output by performing a first set of reprojection operations from the one or more displays to the one or more image sensors using a first set of reprojection parameters, wherein the first set of reprojection parameters uses a first focal length that is longer than a real focal length used to capture the one or more images via the one or more image sensors; and
    present the display output using the one or more displays.

8. The system of claim 7, wherein, upon capturing the one or more images, generating the display output and presenting the display output occurs in real time or near real time.

9. The system of claim 7, wherein the first zoom level is selectively modifiable based on user input.

10. The system of claim 7, wherein the display output further comprises a second region, wherein the second region depicts second scene content represented in the one or more images with a second zoom level, wherein the second zoom level is different from the first zoom level.

11. The system of claim 10, wherein the first zoom level is higher than the second zoom level.

12. The system of claim 10, wherein generating the display output further comprises determining the second scene content for the second region of the display output by performing a second set of reprojection operations from the one or more displays to the one or more image sensors using a second set of reprojection parameters, wherein the second set of reprojection parameters is different from the first set of reprojection parameters.

13. The system of claim 12, wherein the second set of reprojection parameters uses a second focal length that corresponds to the real focal length associated with the one or more image sensors.

14. The system of claim 10, wherein presenting the display output using the one or more displays comprises:
  presenting the first region of the display output on a first set of display pixels of the one or more displays; and
  presenting the second region of the display output on a second set of display pixels of the one or more displays.

15. The system of claim 14, wherein the first set of display pixels comprises a set of central pixels of the one or more displays, and wherein the second set of display pixels comprises a set of peripheral pixels of the one or more displays.

16. A system for providing zoomed representations of scene content, comprising:
  a first image sensor;
  a second image sensor;
  a first display;
  a second display;
  one or more processors; and one or more computer-readable recording media that store instructions that are executable by the one or more processors to configure the system to:

determine a first zoom region center for the first display and a second zoom region center for the second display by:

unprojecting a first ray from a first display center associated with the first display through a first principal point associated with the first display;

determining a first intersection of the first ray with a virtual plane, the virtual plane being arranged at a predetermined depth from the first image sensor and the second image sensor;

unprojecting a second ray from a second display center associated with the second display through a second principal point associated with the second display;

determining a second intersection of the second ray with the virtual plane;

determining a midpoint between the first intersection and the second intersection on the virtual plane;

defining the first zoom region center by projecting the midpoint onto an image plane of the first display; and defining the second zoom region center by projecting the midpoint onto an image plane of the second display.

17. The system of claim 16, wherein the instructions are executable by the one or more processors to configure the system to:

capture a first image using the first image sensor;

capture a second image using the second image sensor;

generate first display output for presentation on the first display, wherein the first display output comprises at least a first region, wherein the first region depicts first scene content represented in the first image with a first zoom level, wherein generating the first display output comprises determining the first scene content for the first region of the first display output by performing a first set of reprojection operations from the first display to the first image sensor using a first set of reprojection parameters, wherein the first set of reprojection parameters uses a first focal length that is longer than a first real focal length associated with the first image sensor;

generate second display output for presentation on the second display, wherein the second display output comprises at least a second region, wherein the second region depicts second scene content represented in the second image with the first zoom level, wherein generating the second display output comprises determining the second scene content for the second region of the second display output by performing a second set of reprojection operations from the second display to the second image sensor using a second set of reprojection parameters, wherein the second set of reprojection parameters uses a second focal length that is longer than a second real focal length associated with the second image sensor;

present the first display output on the first display, wherein the first region is centered on the first zoom region center; and present the second display output on the second display, wherein the second region is centered on the second zoom region center.

18. The system of claim 17, wherein the first zoom region center and the second zoom region center used for presenting the first display output on the first display and the second display output on the second display are selected from a plurality of zoom region center pairs for the first display and the second display, wherein each of the plurality of zoom region center pairs is determined using a different predetermined depth for the virtual plane.

19. The system of claim 16, wherein the system comprises a head-mounted display.

* * * * *